US008184553B2

(12) United States Patent
Nomura et al.

(10) Patent No.: US 8,184,553 B2
(45) Date of Patent: May 22, 2012

(54) METHOD AND APPARATUS FOR MEASURING PACKET TRANSMISSION QUALITY

(75) Inventors: Yuji Nomura, Kawasaki (JP); Hideaki Miyazaki, Kawasaki (JP); Hiroyuki Nakahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 449 days.

(21) Appl. No.: 12/561,430

(22) Filed: Sep. 17, 2009

(65) Prior Publication Data

US 2010/0008250 A1    Jan. 14, 2010

Related U.S. Application Data

(63) Continuation of application No. PCT/JP2007/056055, filed on Mar. 23, 2007.

(51) Int. Cl.
*H04L 12/26* (2006.01)
(52) U.S. Cl. ........................................ 370/252
(58) Field of Classification Search .................... 370/252
See application file for complete search history.

(56) References Cited

U.S. PATENT DOCUMENTS

2005/0182850 A1    8/2005    Kohno

FOREIGN PATENT DOCUMENTS

| JP | 2-299343 | 12/1990 |
|----|----------|---------|
| JP | 4-157842 | 5/1992 |
| JP | 9-200216 | 7/1997 |
| JP | 2003-510918 | 3/2003 |
| JP | 2003-338841 | 11/2003 |
| WO | 01/22762 | 3/2001 |

OTHER PUBLICATIONS

International Search Report dated Apr. 24, 2007, from the corresponding International Application.
Akihiko Tsuno, et al. "A Study of Quality Management Method for Content Delivery Services" Information Processing Society of Japan SIG Technical Report, May 14, 2004.
Notification of Reason for Refusal dated Apr. 5, 2011, from corresponding Japanese Application No. 2009-506096.
Notification of Reasons for Refusal dated Dec. 7, 2010, from the corresponding Japanese Application.

*Primary Examiner* — Derrick Ferris
*Assistant Examiner* — Gbemileke Onamuti
(74) *Attorney, Agent, or Firm* — Katten Muchin Rosenman LLP

(57) ABSTRACT

Packet transmission quality in a communication network is measured by transmitting a measurement packet from a packet transmission node to a packet reception node. The packet transmission node is provided with a transmission counter counting the number of packets transmitted from a packet transmission node to a packet reception node, and a measurement packet counter counting the number of measurement packets transmitted from the packet transmission node to the packet reception mode. The packet reception node is provided with a reception counter counting the number of packets received from the packet transmission node. The packet transmission node transmits a measurement packet including a transmission counter value and a measurement packet counter value, to the packet reception node which calculates the number of lost packets or a loss rate of packets on the basis of the transmission counter value, the measurement packet counter value, and a reception counter value.

17 Claims, 15 Drawing Sheets

METHOD AND APPARATUS FOR MEASURING PACKET TRANSMISSION QUALITY

CROSS-REFERENCE TO RELATED APPLICATION

This is a continuation of Application PCT/JP2007/056055, filed on Mar. 23, 2007, the entire contents of which are incorporated herein by reference.

FIELD

The present invention relates to a packet transmission quality measurement technique.

BACKGROUND

When measuring transmission quality such as loss and delay of packets transmitted in a packet network, a method called a loopback test is generally used. For example, a plurality of measurement packets are transmitted to a node, and the number of responses to the measurement packets from the node and the waiting times until the responses are received are measured. Hereinafter, this method is called active measurement.

On the other hand, it is known that packet loss and delay in a network greatly affect the transmission quality of voice communication and large size file copy in an IP network. For example, even when about 1% loss occurs in the network, the quality deteriorates significantly. Therefore, the loss rate must be measured with a precision of at least 1%. In order to measure the loss with such precision, from hundreds to thousands of measurement packets must be transmitted/received in active measurement. Therefore, there is a problem that conventional active measurement has no small effect on user traffic.

As a different method, there is a method called passive measurement. This method calculates a loss rate from an irregularity in the sequence numbers written in packets. For example, in the case of a TCP/IP packet, the loss rate can be calculated by using the TCP sequence number. The sequence numbers are also written in RTP (Real-Time Transport Protocol) generally used in voice communication, and, in the same way, the loss rate can be calculated by using the sequence numbers. Since this method, which is different from active measurement, does not transmit measurement packets, the method has characteristics of not affecting user packets very much even when a communication line is congested by user packets. However, in passive measurement, every time a user packet is received, connections must be classified into application levels such as TCP and RTP and the sequence numbers must be analyzed for each connection, although passive measurement does not affect user packets because passive measurement does not transmit/receive measurement packets. Therefore, passive measurement has a problem that a large storage capacity is required and processing workload is heavy.

On the other hand, since, in active measurement, only the measurement packets have to be processed, active measurement has a merit that processing of software/hardware is relatively simple, processing workload is light, and measurement is realized with a low cost. A method is desired which can measure the packet transmission quality with high accuracy, with not significantly affecting user packets, while taking advantage of the merits of active measurement.

Japanese Laid-open Patent Publication No. 2003-510918 discloses a technique for counting a loss of transmission frames in a cellular wireless network which is an asynchronous network.

SUMMARY

According to an aspect of the invention, there is provided a method for measuring packet transmission quality in a communication network including a packet transmission node and a packet reception node. The method includes: providing the packet transmission node with a transmission counter and a measurement packet counter, the transmission counter counting the number of packets transmitted from the packet transmission node to the packet reception node, the measurement packet counter counting the number of measurement packets transmitted from the packet transmission node to the packet reception mode so as to measure transmission quality of packets transmitted from the packet transmission node to the packet reception node; providing the packet reception node with a reception counter counting the number of packets received from the packet transmission node; transmitting, by the packet transmission node, to the packet reception node a measurement packet including a transmission counter read out from the transmission counter and a measurement packet counter value read out from the measurement packet counter; and calculating, by the packet reception node, the number of lost packets or a loss rate of packets on the basis of the transmission counter value obtained from the received measurement packets, the measurement packet counter value obtained from the received measurement packets, and a reception counter value read out from the reception counter.

The object and advantages of the invention will be realized and attained by means of the elements and combinations particularly pointed out in the claims.

It is to be understood that both the foregoing general description and following detailed description are exemplary and explanatory and are not restrictive of the invention, as claimed.

DESCRIPTION OF EMBODIMENTS

In the case of an asynchronous network such as a packet network, although a conventional active measurement has a merit of being able to realize a measurement of transmission quality such as packet loss and delay with a light workload and low cost, there is a problem that the measurement packets affect user packets to cause delay and loss which deteriorates the quality when there are a lot of user packets as usual user traffic other than measurement packets, thereby lowering the measurement accuracy.

Figure 1:
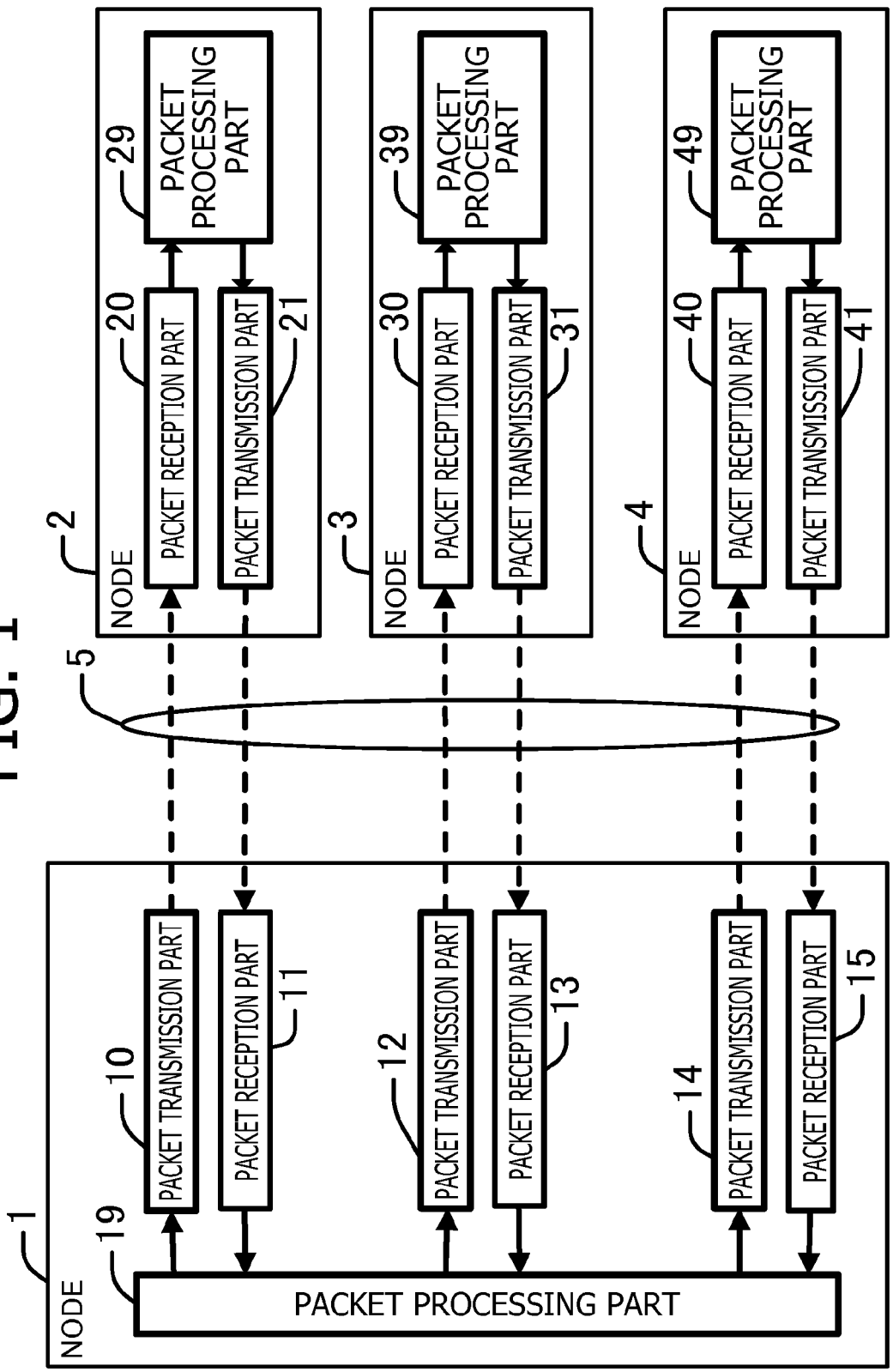
FIG. 1 is a diagram illustrating an example of a connection in a network.

FIG. 1 is a diagram illustrating an example of a connection in a network.

Here, a processing apparatus which performs processing on data contained in a packet and packet transmission/reception processing in a packet transmission network is represented as a node. The node includes a packet transmission part for transmitting a packet to a network, a packet reception part for receiving a packet from a network, and a packet processing part for performing predetermined processing on a packet. FIG. 1 illustrates a case in which the node 1 communicates with the nodes 2, 3, and 4 via the network 5 as a representative example.

The node 1 includes the packet processing part 19 for processing data in a packet, and three pairs of packet transmission/reception parts, which are a packet transmission part 10, a packet reception part 11, a packet transmission part 12, a packet reception part 13, a packet transmission part 14, and a packet reception part 15.

The node 2 includes a packet processing part 29, a packet reception part 20, and a packet transmission part 21. In the same way, the node 3 includes a packet processing part 39, a packet reception part 30, and a packet transmission part 31, and also the node 4 includes a packet processing part 49, a packet reception part 40, and a packet transmission part 41.

The packet transmission quality measurement method of an embodiment can be applied to each of the above packet transmission parts and packet reception parts, and can be configured by being installed in the packet transmission parts and the packet reception parts, or can be configured by using an external apparatus connected to the packet transmission parts or the packet reception parts. In the description below related to a configuration of the measurement apparatus of the embodiment, a case in which the measurement apparatus is externally connected to the packet transmission parts or the packet reception parts is described as a representative example. However, a case in which the measurement apparatus is configured by being installed in the packet transmission parts or the packet reception parts can be realized in the same way.

In the configuration example in FIG. 1, for convenience of illustration, a configuration in which the node 1 includes three pairs of packet transmission parts and packet reception parts, and each of the nodes 2, 3, and 4 includes a pair of a packet transmission part and a packet reception part is depicted. However, the configuration is not limited to this, and each node may include any number of packet transmission parts and packet reception parts. Although FIG. 1 illustrates an example of packet communication between the node 1 and three nodes, the number of nodes is not limited, and any number is possible.

In the configuration of FIG. 1, the minimum requirement for packet communications between the node 1 and the nodes 2, 3, and 4 is that the node 1 is communicably connected to the nodes 1, 2, and 3 via the network 5, and a configuration in which one or more other nodes exist in the network 5 between the node 1 and the nodes 1, 2, and 3 may be possible. The embodiment only has to be applied to a node of a packet transmission source (hereinafter represented as a packet transmission node) and a node of a packet transmission destination (hereinafter represented as a packet reception node), and nodes existing in a communication path between the packet transmission node and the packet reception node may be conventional nodes.

As described above, the embodiment can be applied to various connection forms between nodes. However, in the description below, the embodiment will be described by using the configuration example of FIG. 1 in which the node 1 is the packet transmission node and the node 2 is the packet reception node as a model.

Figure 2:
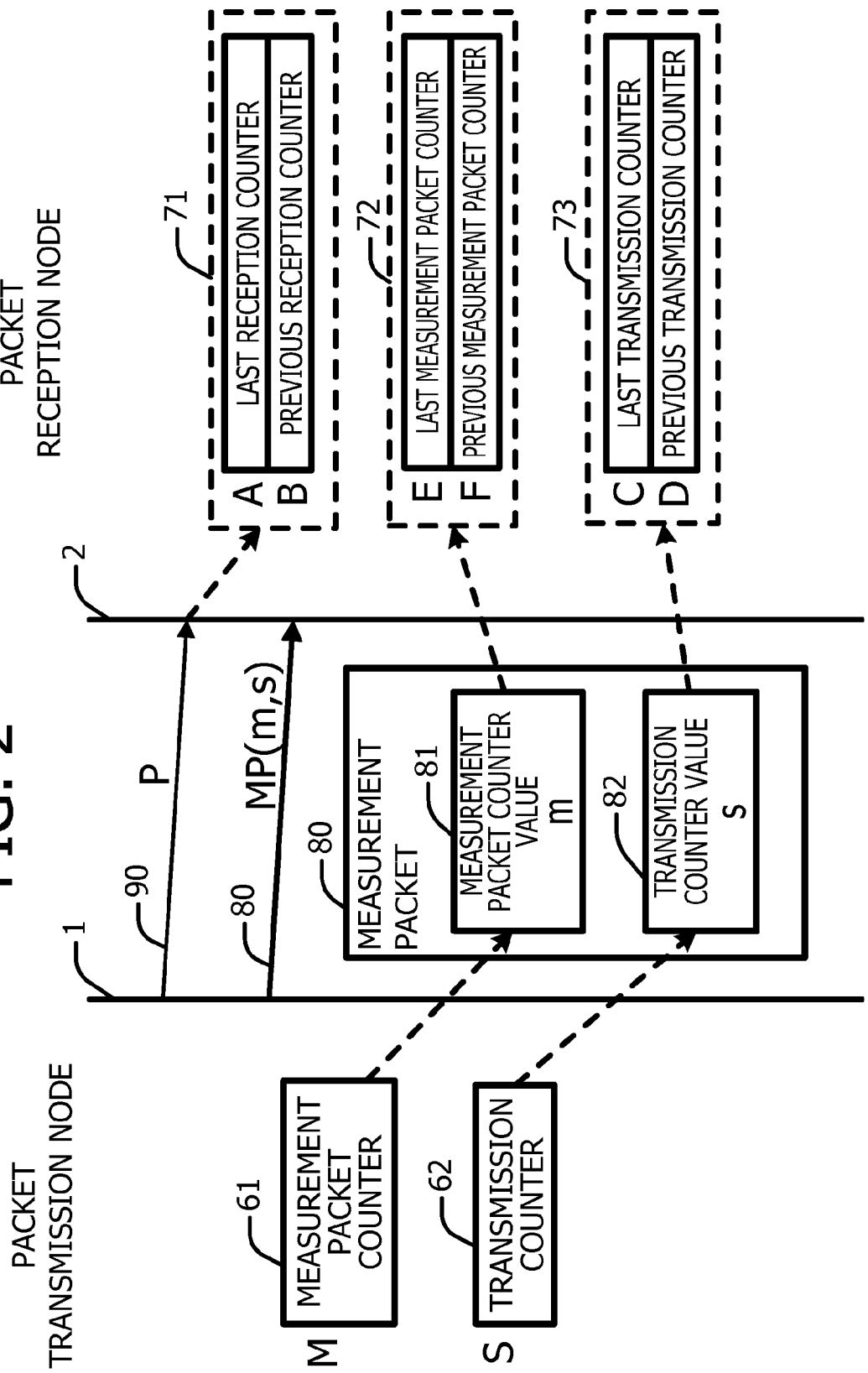
FIG. 2 is a schematic diagram illustrating an example of counters, according to an embodiment.

FIG. 2 is a schematic diagram illustrating an example of counters, according to an embodiment, in which a relationship between counters used in a packet transmission node 1 and a packet reception node 2 is depicted, by using a case depicted in FIG. 1 where the packet transmission quality from the packet transmission node 1 to the packet reception node 2 is measured as an example.

The packet transmission node 1 includes a measurement packet counter 61 (hereinafter also abbreviated as "M") and a transmission counter 62 (hereinafter also abbreviated as "S").

The packet transmission node 1 counts up (+1) the transmission counter S 62 when transmitting a user packet 90 (hereinafter also abbreviated as "P") to the packet reception node 2 as the transmission destination. When a predetermined condition is satisfied, the packet transmission node 1 counts up (+1) the measurement packet counter M 61, and transmits, to the packet reception node 2, a measurement packet 80 (hereinafter abbreviated as "MP" or "MP(m, s)") including a measurement packet counter value 81 (hereinafter abbreviated as "m") which is a value of the measurement packet counter M having been counted up by 1, and a transmission counter value 82 (hereinafter abbreviated as "s") which is a value of the transmission counter S at that time.

As for the predetermined condition for transmitting the above measurement packet MP 80, for example, the packet transmission node 1 may transmit a measurement packet MP when user packet P is not transmitted in a predetermined time period, or when a certain time period sufficiently long so that the measurement packet MP hardly affects the traffic of user packets, has elapsed.

The reception node 2 includes a reception counter 71, a measurement packet counter 72, and a transmission counter 73, and each of them includes two counters for a last value and a previous value. Specifically, the reception counter 71 includes a last reception counter A and a previous reception counter B, the measurement packet counter 72 includes a last measurement packet counter E and a previous measurement packet counter F, and the transmission counter 73 includes a last transmission counter C and a previous transmission counter D.

The packet reception node 2 counts up the last reception counter A every time a user packet P is received.

When receiving a measurement packet MP, the packet reception node 2 copies the value of the last transmission counter C into the previous transmission counter D, and thereafter, sets the value "m" of the transmission counter value 82 included in the received measurement packet MP to the last transmission counter C. And the packet reception node 2 copies the value of the last measurement packet counter E into the previous measurement packet counter F, and thereafter, counts up (+1) the last measurement packet counter E.

The packet reception node 2 calculates the number of lost packets and a loss rate of packets on the basis of the values of the last reception counter A, the previous reception counter B, the last transmission counter C, the previous transmission counter D, the last measurement packet counter E, and the previous measurement packet counter F. At this time, when the values of the counters A, B, C, and D are the initial value "0", it is meaningless to calculate the number of lost packets and the loss rate of packets, and the packet reception node 2 may be configured so that the number of lost packets and the loss rate, which are unnecessary, are not calculated.

After the above calculation processing of the number of lost packets and the loss rate of packets is completed, the packet reception node 2 copies the value of the last reception counter A into the previous reception counter B.

As described above, the packet reception node 2 updates and holds last values and previous values of the reception counter, the transmission counter, and the measurement packet counter, so that the number of lost packets and the loss rate of packets can be calculated. The calculation method of the number of lost packets and the loss rate of packets will be described later.

In FIG. 2 above, to simplify the figure, a case in which there is one reception counter 71 and one transmission counter 73 is depicted. However, the reception counter 71 and the transmission counter 73 can be provided for each type of packet to be transmitted. In this case, the transmission counter 62 of the transmission node 1 is also provided for each type of packet to be transmitted. In this way, the number of lost packets and the loss rate of packets for each packet type can be calculated.

Figure 3:
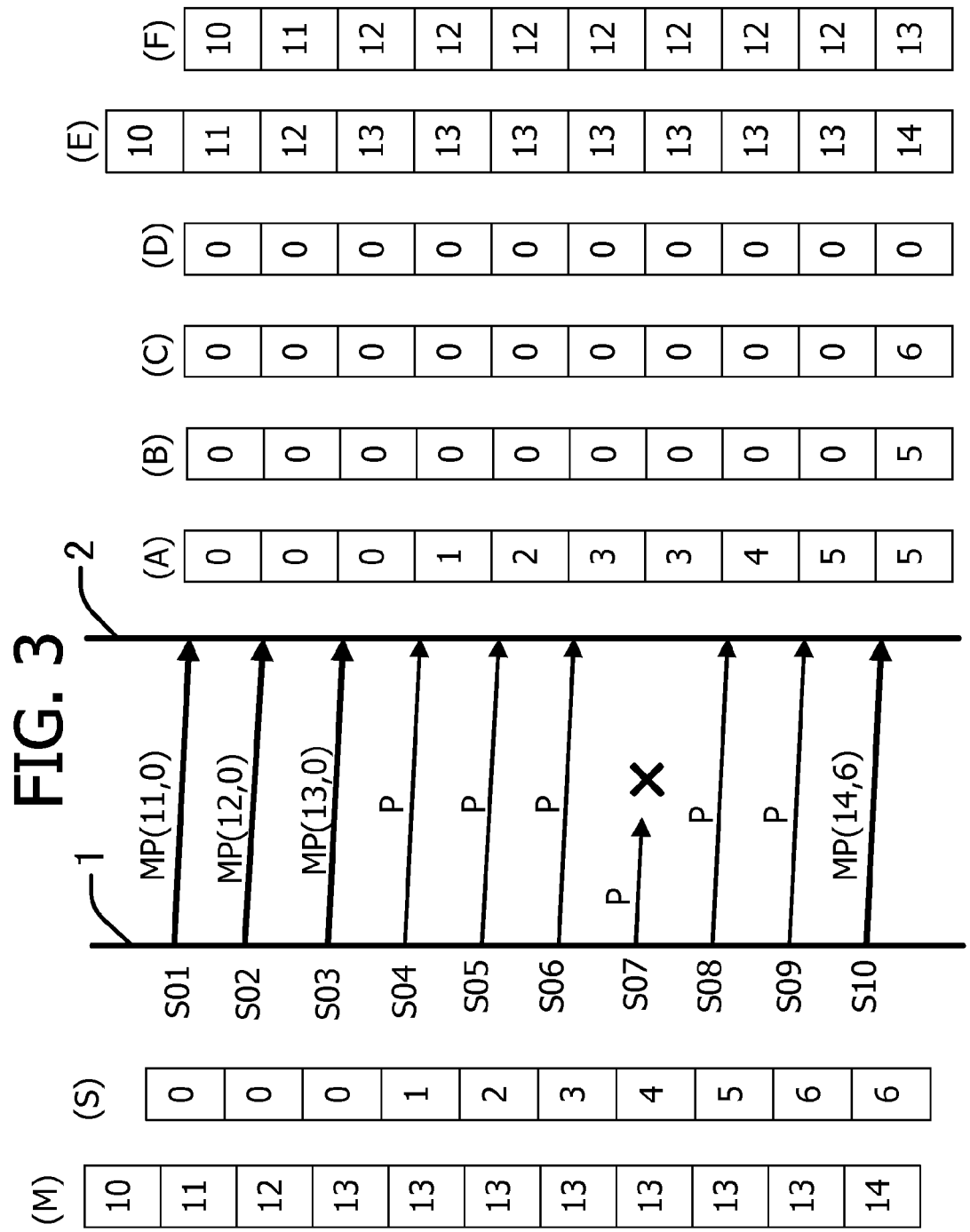
FIG. 3 is a diagram illustrating an example of a packet transmission sequence and counter values corresponding thereto, according to an embodiment.

FIG. 3 is a diagram illustrating an example of a packet transmission sequence and counter values corresponding thereto, according to an embodiment, indicating a relationship between packets transmitted from the packet transmission node 1 to the packet reception node 2, and processing on counters in the packet transmission node 1 and the packet reception node 2.

The measurement packet counter M and the transmission counter S of the transmission node 1 are represented as (M) and (S), respectively, and the last reception counter A, the previous reception counter B, the last transmission counter C, the previous transmission counter D, the last measurement packet counter E, and the previous measurement packet counter F of the packet reception node 2 are represented as (A), (B), (C), (D), (E), and (F), respectively. The transition of counter values is depicted in time series under each of the reference symbols (M), (S), (A), (B), (C), (D), (E), and (F). The measurement packet MP which includes the measurement packet counter value "m" and the transmission counter value "s" is abbreviated as "MP (m, s)". The above representations will be used in the same way in a later description.

A description will be given in accordance with processing steps S01 to S10 corresponding to the packet transmission sequence.

In step S01, when a predetermined condition for transmitting a measurement packet is satisfied, a packet transmission node 1 counts up (+1) the value "10" (becoming "11") of the measurement packet counter M at that time point, creates the measurement packet MP (11, 0) including the value "11" of the measurement packet counter M having been counted up and the value "0" of the transmission counter S, and transmits the measurement packet MP (11, 0) to the packet reception node 2. At this time, the transmission counter S is not counted up because a user packet P is not transmitted.

When receiving the measurement packet MP (11, 0), the packet reception node 2 copies the value (here, "10" as depicted in FIG. 3) of the last measurement packet counter E into the previous measurement packet counter F, and thereafter, sets the measurement packet counter value "11" included in the received measurement packet MP (11, 0) into the last measurement packet counter E. The packet reception node 2 copies the value of the last transmission counter C into the previous transmission counter D, and thereafter, sets the transmission counter value "0" included in the received measurement packet MP (11, 0) to the last transmission counter C. The last reception counter A is not counted up because the received MP is not a user packet P. At this time point, the calculation of the number of lost packets and the loss rate of packets is not performed because the initial value "0" is set in the reception counters A, B and the transmission counters C, D, and a user packet has not been received.

In step S02, the packet transmission node 1 counts up (+1) the value "11" (becoming "12") of the measurement packet counter M at that time point, creates the measurement packet MP (12, 0) including the value "12" of the measurement packet counter M having been counted up and the value "0" of the transmission counter S, and transmits the measurement packet MP (12, 0) to the packet reception node 2. At this time, the transmission counter S is not counted up because a user packet P is not transmitted.

When receiving the measurement packet MP (12, 0), the packet reception node 2 copies the value ("11") of the last measurement packet counter E into the previous measurement packet counter F, and thereafter, sets the measurement packet counter value "12" included in the received measurement packet MP(12, 0) to the last measurement packet counter E. The packet reception node 2 copies the value of the last transmission counter C into the previous transmission counter D, and thereafter, sets the transmission counter value "0" included in the received measurement packet MP(12, 0) to the last transmission counter C. The last reception counter A is not counted up because the received packet is not a user packet P. At this time point, the calculation of the number of lost packets and the loss rate of packets is not performed because the initial value "0" is set in the reception counters A, B and the transmission counters C, D, and a user packet has not been received.

In step S03, the packet transmission node 1 counts up (+1) the value "12" (becoming "13") of the measurement packet counter M at that time point, creates the measurement packet MP (13, 0) including the value "13" of the measurement packet counter M having been counted up and the value "0" of the transmission counter S, and transmits the measurement packet MP (13, 0) to the packet reception node 2. At this time, the transmission counter S is not counted up because a user-packet P is not transmitted.

When receiving the measurement packet MP (13, 0), the packet reception node 2 copies the value ("12") of the last measurement packet counter E into the previous measurement packet counter F, and thereafter, sets the measurement packet counter value "13" included in the received measurement packet MP (13, 0) to the last measurement packet counter E. The packet reception node 2 copies the value of the last transmission counter C into the previous transmission counter D, and thereafter, sets the transmission counter value "0" included in the received measurement packet MP (13, 0) to the last transmission counter C. The last reception counter A is not counted up because the received MP is not a user packet P. At this time point, the calculation of the number of lost packets and the loss rate of packets is not performed because the initial value "0" is set in the reception counters A, B and the transmission counters C, D, and the user packet has not been received.

In step S04, the packet transmission node 1 transmits a user packet P to the packet reception node 2, and counts up (+1) (becoming "1") the transmission counter S.

When receiving the user packet P, the packet reception node 2 counts up (+1) (becoming "1") the last reception counter A, as depicted in FIG. 3.

In step S05, the packet transmission node 1 transmits a user packet P to the packet reception node 2, and counts up (+1) (becoming "2") the transmission counter S.

When receiving the user packet P, the packet reception node 2 counts up (+1) (becoming "2") the last reception counter A, as depicted in FIG. 3.

In step S06, the packet transmission node 1 transmits a user packet P to the packet reception node 2, and counts up (+1) (becoming "3") the transmission counter S.

When receiving the user packet P, the packet reception node 2 counts up (+1) (becoming "3") the last reception counter A, as depicted in FIG. 3.

In step S07, the packet transmission node 1 transmits a user packet P to the packet reception node 2, and counts up (+1) (becoming "4") the transmission counter S. However, for some reason, between the packet transmission node 1 and the packet reception node 2, the user packet P does not arrive at the packet reception node 2 and packet loss has occurred. Therefore, the packet reception node 2 does not receive the user packet P, so that the last reception counter A is not counted up.

In step S08, the packet transmission node 1 transmits the user packet P to the packet reception node 2, and counts up (+1) (becoming "5") the transmission counter S.

When receiving the user packet P, the packet reception node 2 counts up (+1) (becoming "4") the last reception counter A, as depicted in FIG. 3.

In step S09, the packet transmission node 1 transmits a user packet P to the packet reception node 2, and counts up (+1) (becoming "6") the transmission counter S.

When receiving the user packet P, the packet reception node 2 counts up (+1) (becoming "5") the last reception counter A.

In step S10, when a predetermined condition for transmitting a measurement packet is satisfied, the packet transmission node 1 counts up (+1) the value "13" (becoming "14") of the measurement packet counter M at this time point, creates a measurement packet MP (14, 6) including the value "14" of the measurement packet counter M having been counted up and the value "6" of the transmission counter S, and transmits the measurement packet MP (14, 6) to the packet reception node 2. At this time, the transmission counter S is not counted up because a user packet P is not transmitted.

When receiving the measurement packet MP (14, 6), the packet reception node 2 copies the value "13" of the last measurement packet counter E into the previous measurement packet counter F, and thereafter, sets the measurement packet counter value "14" included in the received measurement packet MP(14, 6) to the last measurement packet counter E. The packet reception node 2 copies the value "0" of the last transmission counter C into the previous transmission counter D, and thereafter, sets the transmission counter value "6" included in the received measurement packet MP (14, 6) to the last transmission counter C. After calculating the number of lost packets and the loss rate of packets by using a method described later, the packet reception node 2 copies the value "5" of the last reception counter A into the previous reception counter B.

The embodiment depicted in FIG. 3 illustrates an example in which the transmission counter and the reception counter are reset only when the packet transmission node 1 and/or the packet reception node 2 are initialized, but not reset when the measurement packet MP is transmitted/received. However, the transmission counter and the reception counter can be configured to be reset every time the measurement packet is transmitted/received.

The calculation method of the number of lost packets and the loss rate of packets is, for example, as the following example of calculation procedure, in which the value of the last reception counter A is represented by "a", the value of the previous reception counter B is represented by "b", the value of the last transmission counter C is represented by "c", the value of the previous transmission counter D is represented by "d", the value of the last measurement packet counter E is represented by "e", and the value of the previous measurement packet counter F is represented by "f".

[An Example of Calculation Procedure]

First, (the number of transmitted user packets)=(the value of the last transmission counter $C$)−(the value of the previous transmission counter $D$)=$c-d$ and, (the number of received user packets)=(the value of the last reception counter $A$)−(the value of the previous reception counter $B$)=$a-b$.

Therefore, the number of lost user packets "Lc(P)" can be obtained by the following calculation:

$Lc(p)$=(the number of transmitted user packets)−(the number of received user packets)=$(c-d)-(a-b)$    (Expression 1)

Therefore, the loss rate "Lr (P)" of user packets can be obtained by the following calculation:

$Lr(p)$=(the number of lost user packets)/(the number of transmitted user packets)=$\{c-d\}-(a-b)\}/(c-d)$    (Expression 2)

In the packet reception node 2, the loss rate can be calculated by using not only the counters A, B, C, D related to the user packet, but also the measurement packet counters E, F, in order to consider the loss of measurement packets. For example, a case in which the measurement packets MP (12, 0) and MP (13, 0) are lost in the example of FIG. 3 can be supposed. In this case, the number of lost measurement packets "Lc (MP)" can be obtained as follows:

$Lc(MP)=e-f-1$

And then, "Lc (P+MP)", that is, the total number of user packets and measurement packets which are lost from when a first measurement packet is received to when a second measurement packet is received, is calculated as follows:

$Lc(P+MP)=Lc(P)+Lc(MP)=(c-d)-(a-b)+e-f-1$    (Expression 3)

At this time, the loss rate "Lr (P+MP)" can be obtained as follows:

Lr(*P*+MP)=(the total number of lost user packets and lost measurement packets)/(the number of transmitted packets)=*Lc*(*P*+MP)/{(*c*−*d*)+*Lc*(MP)+2}={(*c*−*d*)−(*a*−*b*)+*e*−*f*−1}/{(*c*−*d*)+*e*−*f*+1}    (Expression 4)

For example, in a case of FIG. 3, when the measurement packets MP(12, 0) and MP(13, 0) are lost, the calculation is as follows.

*Lc*(MP)=2,

*Lc*(*P*+MP)=*Lc*(*P*)+*Lc*(MP)=1+2=3, *c*=6, *d*=0

Therefore, the result is:

Lr(*P*+MP)=3/10=0.3

In this way, the number of lost packets and the loss rate of packets are calculated including the loss of measurement packets. Therefore, even during a time zone in which the user packets are not transmitted, the packet transmission quality can be measured by transmitting the measurement packets.

As depicted in FIG. 3 above, according to the embodiment, the measurement packets can be transmitted efficiently by using a time gap between user packet transmissions, and the measurement of the number of lost packets or the loss rate of packets is possible while affecting the user packet traffic as little as possible.

Figure 4:
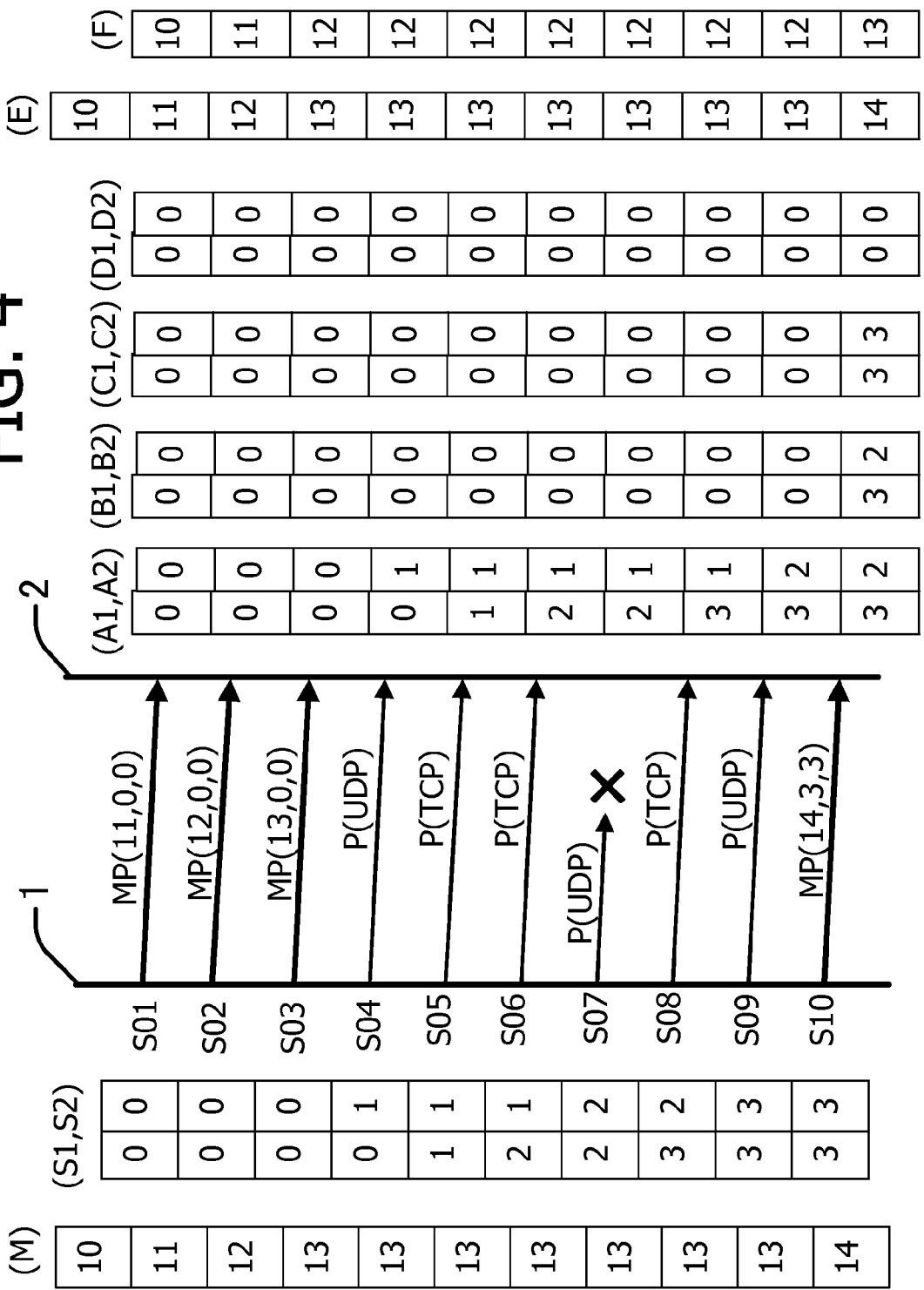
FIG. 4 is a diagram illustrating an example of a packet transmission sequence and counter values corresponding thereto, according to an embodiment.

FIG. 4 is a diagram illustrating an example of a packet transmission sequence and counter values corresponding thereto, according to an embodiment, indicating a relationship between packets transmitted from the packet transmission node 1 to the packet reception node 2, and processing on counters in the packet transmission node 1 and the packet reception node 2, in the case of obtaining the number of lost packets and the loss rate of packets for each packet type.

In this example, two types of user packets of UDP and TCP, which are different protocols, are used, and the packet transmission quality (for example, the number of lost packets and the loss rate of packets) is calculated for each packet type. Therefore, in the case of FIG. 4, there are two transmission counters S1 and S2 in the transmission node 1 instead of one transmission counter S as depicted in FIG. 3. Also corresponding to the last reception counter A, the previous reception counter B, the last transmission counter C, and the previous transmission counter D in the packet reception node 2 depicted in FIG. 3, the last reception counters A1 and A2, the previous reception counters B1 and B2, the last transmission counters C1 and C2, and the previous transmission counters D1 and D2 are respectively used for the two types of user packets of TCP and UDP.

In FIG. 4, the measurement packet MP which includes the measurement packet counter value "m", the transmission counter value "s1" for TCP, and the transmission counter value "s2" for UDP is abbreviated as "MP (m, s1, s2)". The TCP user packet is represented as "P(TCP)", and the UDP user packet is represented as "P(UDP)". The pairs of counters corresponding to the two types of packets of TCP and UDP are respectively abbreviated as "(S1, S2)", "(A1, A2)", "(B1, B2)", "(C1, C2)", and "(D1, D2)", and their values are also abbreviated as, for example, "(0, 0)".

The difference from the example of a packet transmission sequence and the counter update corresponding thereto depicted in FIG. 3 above, is that the transmission counter S of the packet transmission node 1 is provided for each packet type, and the last reception counter A, the previous reception counter B, the last transmission counter C, and the previous transmission counter D of the packet reception node 2 are also provided for each packet type (in FIG. 4, two types of packets of TCP and UDP).

In step S01, when a predetermined condition for transmitting a measurement packet is satisfied, the packet transmission node 1 counts up (+1) the value "10" (becoming "11") of the measurement packet counter M at that time point, creates the measurement packet MP (11, 0, 0) including the value "11" of the measurement packet counter M having been counted up and the values "(0, 0)" of the transmission counters (S1, S2), and transmits the measurement packet MP (11, 0, 0) to the packet reception node 2. At this time, the transmission counters (S1, S2) are not counted up because a user packet P is not transmitted.

When receiving the measurement packet MP (11, 0, 0), the packet reception node 2 copies the value (here, "10") of the last measurement packet counter E into the previous measurement packet counter F, and thereafter, sets the measurement packet counter value "11" included in the received measurement packet MP (11, 0, 0) to the last measurement packet counter E. The packet reception node 2 copies the values of the last transmission counters (C1, C2) into the previous transmission counters (D1, D2), and thereafter, sets the transmission counter values "(0, 0)" included in the received measurement packet MP (11, 0, 0) to the last transmission counters (C1, C2). The last reception counters (A1, A2) are not counted up because the received packet is not a user packet P. At this time point, the calculation of the number of lost packets and the loss rate of packets is not performed because the initial values "(0, 0)" are set in the reception counters (A1, A2), (B1, B2), and the transmission counters (C1, C2), (D1, D2), and a user packet has not been received.

In steps S02 and S03, the operation is performed in the same way as the above step S01.

In step S04, the packet transmission node 1 transmits a user packet P (UDP) whose packet type is UDP to the packet reception node 2, and counts up (+1) (becoming "1") the UDP transmission counter S2.

When receiving the user packet P (UDP), the packet reception node 2 counts up (+1) (becoming "1") a UDP last reception counter A2.

In step S05, the packet transmission node 1 transmits the user packet P (TCP) whose packet type is TCP to the packet reception node 2, and counts up (+1) (becoming "1") the TCP transmission counter S1.

When receiving the user packet P (TCP), the packet reception node 2 counts up (+1) (becoming "1") a TCP last reception counter A1.

In step S06, the packet transmission node 1 transmits the user packet P (TCP) to the packet reception node 2, and counts up (+1) (becoming "2") the TCP transmission counter S1.

When receiving the user packet P (TCP), the packet reception node 2 counts up (+1) (becoming "2") the TCP last reception counter A1.

In step S07, the packet transmission node 1 transmits the user packet P (UDP) to the packet reception node 2, and counts up (+1) (becoming "2") the UDP transmission counter S2. However, for some reason, between the packet transmission node 1 and the packet reception node 2, the user packet P (UDP) does not arrive at the packet reception node 2 and a packet loss has occurred. Therefore, the packet reception node 2 does not receive the user packet P (UDP), so that the UDP last reception counter A2 is not updated.

In step S08, the packet transmission node 1 transmits the user packet P (TCP) to the packet reception node 2, and counts up (+1) (becoming "3") the TCP transmission counter S1.

When receiving the user packet P (TCP), the packet reception node 2 counts up (+1) (becoming "3") the TCP last reception counter A1.

In step S09, the packet transmission node 1 transmits a user packet P (UDP) to the packet reception node 2, and counts up (+1) (becoming "3") the UDP transmission counter S2. When receiving the user packet P (UDP), the packet reception node 2 counts up (+1) (becoming "2") the UDP last reception counter A2.

In step S10, when a predetermined condition for transmitting a measurement packet is satisfied, the packet transmission node 1 counts up (+1) the value "13" (becoming "14") of the measurement packet counter M at that time point, creates a measurement packet MP (14, 3, 3) including the value "14" of the measurement packet counter M having been counted up and the values "(3, 3)" of the transmission counters (S1, S2), and transmits the measurement packet MP (14, 3, 3) to the packet reception node 2. At this time, the transmission counters (S1, S2) are not counted up because a user packet P is not transmitted.

When receiving the measurement packet MP (14, 3, 3), the packet reception node 2 copies the value "13" of the last measurement packet counter E into the previous measurement packet counter F, and thereafter, sets the measurement packet counter value "14" included in the received measurement packet MP(14, 3, 3) to the last measurement packet counter E. The packet reception node 2 copies the values of the last transmission counters (C1, C2) into the previous transmission counters (D1, D2), and thereafter, sets the transmission counter values "(3, 3)" included in the received measurement packet MP(14, 3, 3) to the last transmission counters (C1, C2). The last reception counters (A1, A2) are not counted up because the received packet is not a user packet P. Furthermore, after calculating the number of lost packets and the loss rate of packets for each packet type by using the calculation method of the number of lost packets and the loss rate of packets described with reference to FIG. 3, the packet reception node 2 copies the value "(3, 2)" of the last reception counters (A1, A2) into the previous reception counters (B1, B2).

As described above, the last reception counters "(A1, A2)", the previous reception counters "(B1, B2)", the last transmission counters "(C1, C2)", and the previous transmission counters "(D1, D2)" related to each of TCP and UDP are obtained, and, by using these counters, the number of lost packets and the loss rate of packets can be calculated for each packet type, namely for each of TCP packet and UDP packet, in the same way described with reference to FIG. 3.

Although, in FIG. 4, a case in which there are two types of packets is described as an example, the embodiment is not limited to this, and in a case in which there are three or more types of packets, it is possible to perform the operation in the same way as the case in which there are two types of packets.

Since the effect of communication quality varies depending on applications such as a voice data system and a business system, in many cases, it is necessary to know a communication quality level in a given application. In such cases, the packet transmission node 1 and the packet reception node 2 can measure a detailed packet transmission quality for each application by identifying a type of packet corresponding to the application and using transmission/reception counters for each packet type.

In the above example, an example using two types of packets of TCP and UDP is described. Other than the above example, as an example of packet types, in the case of TCP/IP, the packet types can be set on the basis of the application type indicated by the field of the port number written in the header, the packet priority, the control flag, the value written in the payload which is used by the application, and the like. The same conditional information on how to use a value in a given field in a given header in order to determine a packet type must be set, in advance, to both the packet transmission node and the packet reception node, as measurement condition and information. The setting can be performed by using a known operation management protocol such as TELNET, SSH, SNMP, NETCONF, FTP, and the like.

In the above example of FIG. 4, the counters are updated independently between packet types (for example, between UDP and TCP). However, counters for a plurality of packet types may be configured to be updated at the same time.

Figure 5:
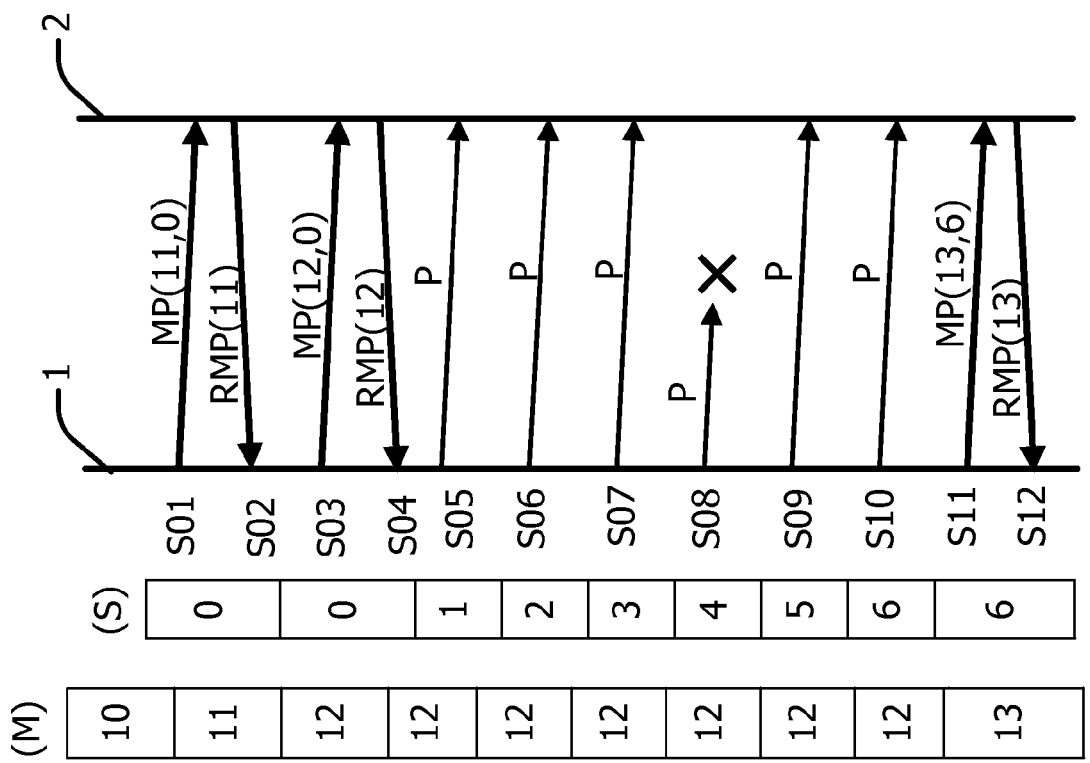
FIG. 5 is a diagram illustrating an example of packet transmission sequence and counter values corresponding thereto, according to an embodiment.

FIG. 5 is a diagram illustrating an example of packet transmission sequence and counter values corresponding thereto, according to an embodiment, indicating relationship between the packet transmission sequence and the counter values in the packet transmission node 1 in the case of measuring a packet transmission delay time.

This embodiment is characterized in that the packet transmission delay time is measured between the packet transmission node 1 and the packet reception node 2 along with the number of lost packet and the loss rate of packets by returning a response packet "RMP" from the reception node 2 in response to the measurement packet MP. Here, the counter values in the packet reception node 2 are the same as those depicted in FIG. 3, and therefore, to simplify the figure, the counters in the packet reception node 2 are omitted in FIG. 5.

In step S01, the packet transmission node 1 stores the time T1 of transmitting a measurement packet MP to a packet reception node 2, and transmits the measurement packet MP (11, 0) to the packet reception node 2. Upon receiving the measurement packet MP (11, 0), the packet reception node 2 creates a response packet RMP in response to the measurement packet MP (11, 0), and transmits the response packet RMP to the packet transmission node 1. At this time, the response packet RMP can be configured to include a measurement packet count value (for example, in the case, "11") which is included in the original measurement packet MP (11, 0) in order to identify the measurement packet MP to which the response packet RMP responds. The response packet at this time is represented as "RMP (11)". When a measurement packet count value is included in the response packet RMP, the packet transmission node 1 can use the measurement packet count value to obtain the transmission time of the measurement packet MP corresponding to the received response packet RMP.

In step S02, when receiving the response packet RMP (11), the packet transmission node 1 obtains the reception time T2, calculates the difference between T2 and T1 which was stored in the above step S01, and stores the calculated result as a packet transmission response time between the packet transmission node 1 and the packet reception node 2.

In steps S03 to S04, a packet transmission response time is calculated and stored in the same way as the above steps S01 to S02.

In steps S05 to S10, a processing related to the user packet transmission is performed in the manner similar to the steps in FIG. 3.

In steps S11 to S12, a packet transmission response time is calculated and stored in the same way as the above steps S01 to S02.

The packet reception node 2 or a network management system may be configured to inquire a packet transmission delay time, that is, the above mentioned packet transmission response time, from the packet transmission node 1 by using a known protocol for node management, such as TELNET, SSH, SNMP, NETCONF, and FTP. In the case, in response to the inquiry, the packet transmission node 1 transmits the accumulated packet transmission delay time along with the time at which the packet transmission delay time was measured.

The packet transmission delay time may be measured every time the measurement packet MP is transmitted as depicted in the above FIG. 5, or also may be measured in a time interval which is set in the packet transmission node 1 or the packet reception node 2. Furthermore, the measurement packet for measuring the packet transmission delay may be transmitted on the basis of an instruction from another node such as an operation management server in the network. In this case, the measurement packet MP can be configured to include information indicating whether the response packet should be returned or not.

Figure 6:
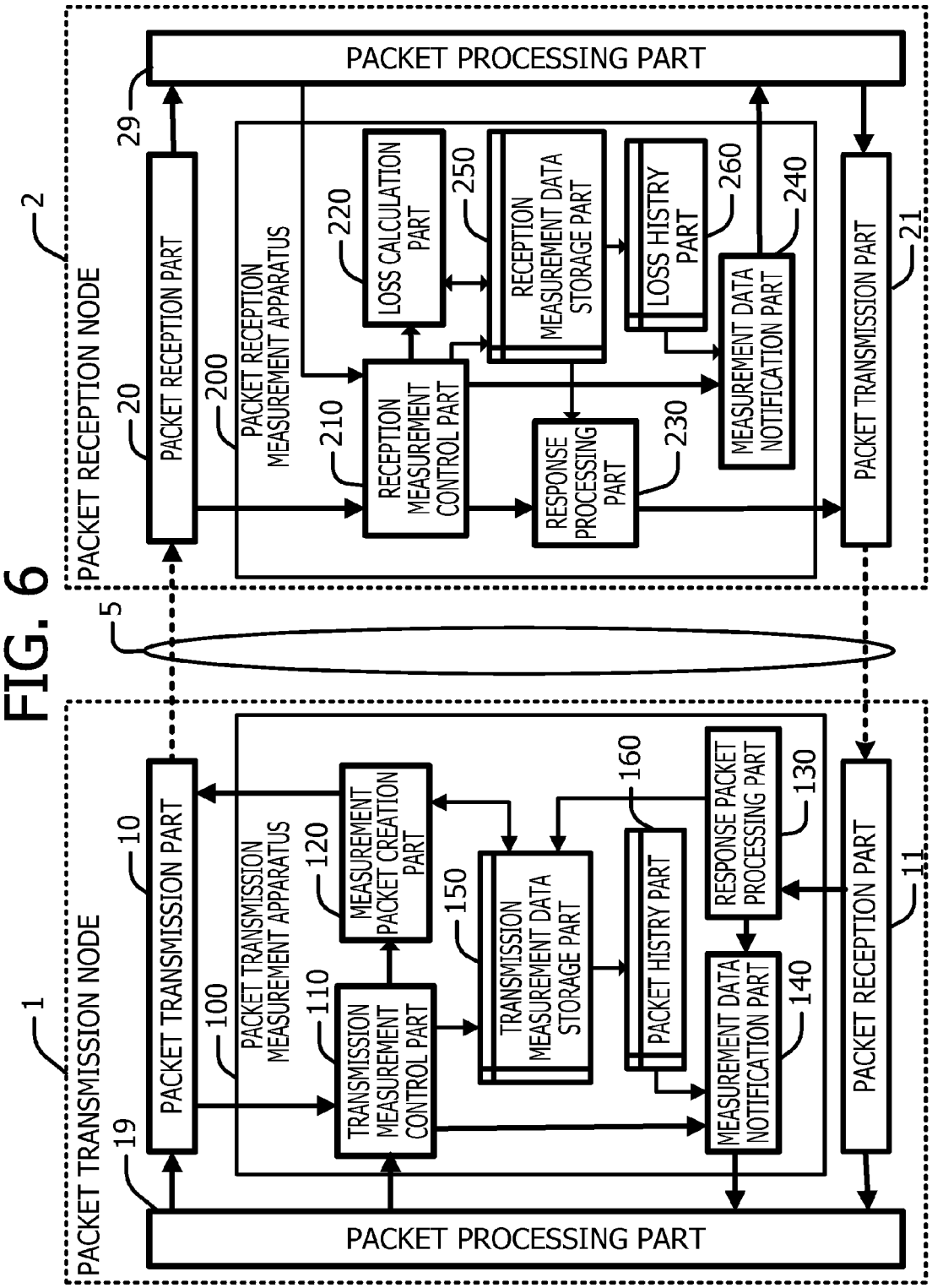
FIG. 6 is a diagram illustrating an example of a configuration of a packet transmission quality measurement apparatus, according to an embodiment.

FIG. 6 is a diagram illustrating an example of a configuration of a packet transmission quality measurement apparatus, according to an embodiment.

According to the embodiment, the packet transmission quality measurement apparatus measures the packet transmission quality in cooperation with a packet transmission part and a packet reception part included in the packet processing apparatus (or node). The part cooperating with the packet transmission part is represented as a packet transmission measurement apparatus, and the part cooperating with the packet reception part is represented as a packet reception measurement apparatus. In the configuration example in FIG. 6, the packet transmission part 10 and the packet transmission measurement apparatus 100 in the packet transmission node 1 cooperate with each other, the packet reception part 20 and the packet reception measurement apparatus 200 in the packet reception node 2 cooperate with each other, and the packet transmission node 1 transmits a measurement packet to the packet reception node 2.

First, a packet transmission measurement apparatus 100 will be described.

The packet transmission measurement apparatus 100 includes a transmission measurement control part 110, a measurement packet creation part 120, a response packet processing part 130, a measurement data notification part 140, a transmission measurement data storage part 150, and a packet history part 160.

Every time the packet transmission part 10 transmits a user packet to a network 5, the transmission measurement control part 110 receives predetermined information related to the packet to be transmitted from the packet transmission part 10.

For example, the transmission measurement control part 110 may receive the header part of the packet to be transmitted as the predetermined information. When receiving predetermined information related to a user packet from the packet transmission part 10, the transmission measurement control part 110 determines whether the user packet is to be measured or not on the basis of the information stored in the transmission measurement data storage part 150. When the user packet is to be measured, the transmission measurement control part 110 counts up a transmission counter, which is stored in the transmission measurement data storage part 150, corresponding to the packet type of the user packet to be transmitted.

The determination whether the user packet is to be measured or not is performed by determining, for example, whether or not the destination of the user packet is the packet reception node 2 which is the measurement point, whether or not the type of the user packet is included in the packet types of the transmission counters set in the transmission measurement data storage part 150, whether or not the measurement condition is compliant with the measurement condition defined in the transmission measurement data storage part 150, and/or the like.

The transmission measurement control part 110 determines a condition to create and transmit a measurement packet MP for measuring packet transmission quality. Here, in order not to affect the traffic of user packets as much as possible, for example, the transmission measurement control part 110 monitors the timing at which the predetermined information related to the user packet is sent from the packet transmission part 10, and when the information is not sent even after a certain time period has passed, in other words, when a flow of packets being transmitted from the packet transmission node 1 has stopped for a certain time period to get into a no-communication state, the transmission measurement control part 110 starts the measurement packet creation part 120 to create a measurement packet, and transmits the measurement packet to a predetermined packet reception node 2.

In this way, measurement packets can be transmitted, while not significantly affecting user packet traffic, to measure packet transmission quality.

The monitoring of a certain period may be configured to be performed for a specified type of user packet. In this way, the packet transmission quality can be measured while not affecting the specified type of user packet.

A measurement packet may be transmitted at a timing other than when a state of no packets being transmitted has continued for a predetermined time period as described above. For example, the transmission timing of a measurement packet may determined on the basis of a state irrelevant to the user packet transmission condition, such as a certain time interval such as one minute, a variable time interval such as a random time interval from one second to ten seconds, and a time point at which the workload of the packet transmission node 1 is low. The packet transmission node 1 not always has to determine the transmission condition of a measurement packet autonomously. For example, the packet transmission node 1 can be configured to transmit a measurement packet upon receiving an instruction from an operation management server which manages the network. At this time, for example, the instruction information is sent from the packet processing part 19 to the measurement control part 110 in the packet transmission node 1.

The measurement packet creation part 120, which is started by the transmission measurement control part 110, creates a measurement packet on the basis of counter (a measurement packet counter M and a transmission counter S for each packet type) stored in the transmission measurement data storage part 150, and transmits the measurement packet to a predetermined packet reception node 2.

The measurement packet creation part 120 can be configured to transmit a measurement packet including instruction information indicating a start or end of measurement, to the packet reception node 2, so that the packet reception node 2 can start or end the measurement on the basis of the instruction information. Also, the packet reception node 2 can be configured to obtain the number of lost packets and the loss rate of packets only during a specified limited period. In this way, the packet transmission quality can be measured during the limited period in which user packet traffic is small, so that user packets can be less affected.

A measurement packet creation part 120 can be configured to encrypt the related information in a measurement packet when creating the measurement packet to be transmitted, so that the related information can be decrypted only between the packet transmission node 1 and the packet reception node 2. In this case, an encryption processing and a decryption processing must be, in advance, installed in the packet transmission node 1 and the packet reception node 2, respectively.

A response packet processing part 130 is provided in order to measure a packet transmission delay time. When the packet reception node 2, which received the measurement packet that is created and transmitted by the above measurement packet creation part 120, returns a response packet to the packet transmission node, the response packet processing part 130 receives the response packet, records the reception time thereof in the measurement counter part 150, and furthermore calculates the difference between the transmission time of the measurement packet and the reception time of the response packet so as to record the difference into the transmission measurement data storage part 150 as a packet transmission delay time.

When recording the response time into the transmission measurement data storage part 150, if required, the response packet processing part 130 accumulates the related information into the packet history part 160, at the same time. In this way, in the packet history part 160, information such as the transmission time of the measurement packet, the reception time of the response packet, and the packet transmission delay time, can be accumulatively recorded in time series.

The measurement data notification part 140 reads out the accumulated packet transmission delay information from the packet history part 160 and transmits the packet transmission delay information to a predetermined destination according to an instruction from the measurement control part 110.

The transmission measurement data storage part 150 is an area including a transmission counter S, a measurement packet counter M, and the details thereof will be described later with reference to FIG. 9.

The packet history part 160 is an area for accumulatively storing the packet transmission delay time in time series, and the details thereof will be described later with reference to FIG. 10.

Next, a packet reception measurement apparatus 200 will be described.

The packet reception measurement apparatus 200 is configured to include a reception measurement control part 210, a loss calculation part 220, a response processing part 230, a measurement data notification part 240, a measurement data storage part 250, and a loss history part 260.

The reception measurement control part 210 controls the measurement of transmission quality of received packets, and, for example, every time the packet reception part 20 receives a packet from the network 5, the reception measurement control part 210 receives predetermined information necessary for measuring the packet transmission quality from the packet reception part 20. For example, the reception measurement control part 210 can be configured to receive the header part of the received packet as the predetermined information.

Upon receiving the predetermined information from the packet reception part 20, the reception measurement control part 210 counts up a reception counter for counting the number of received packets, included in the reception measurement data storage part 250, when the received packet is a user packet to be measured. The reception counter may be configured to be provided for each packet type and to count the number of received packets for the each packet type.

Figure 8:
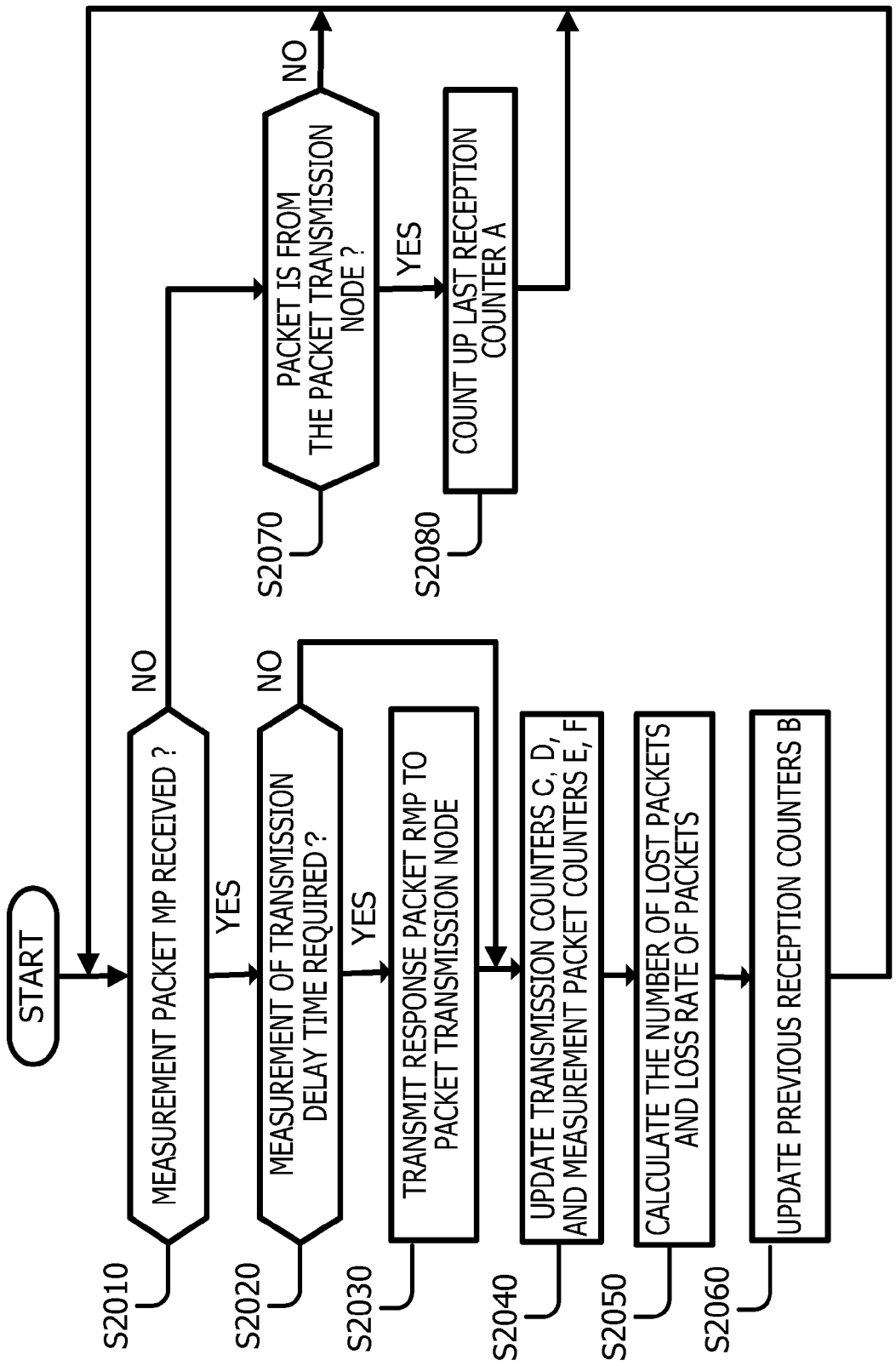
FIG. 8 is a diagram illustrating an example of an operation flow of a packet reception measurement apparatus, according to an embodiment.

Upon receiving a measurement packet reception notification from the packet reception part 20, the reception measurement control part 210 updates the reception counters A, B, the transmission counters C, D, and the measurement packet counters E, F included in the reception measurement data storage part 250 as depicted in FIG. 3, 4, or 8.

The loss calculation part 220, which is started by the reception measurement control part 210, calculates quality data such as the number of lost packets and a loss rate of packets on the basis of the values of various counters included in the reception measurement data storage part 250 by using the method described in the description of FIG. 3, and records the quality data in the reception measurement data storage part 250. At this time, when the accumulative recording to the loss history part 260 is required, the loss calculation part 220 accumulatively records the quality data (the number of lost packets, the loss rate of packets, and the like) in the loss history part 260 at the same time.

The loss history part 260 accumulates quality data, such as the number of lost packets and a loss rate of packets, which has been calculated in the loss calculation part 220 as time series data.

The response processing part 230, which is for measuring the packet transmission delay, creates a response packet RMP on the basis of the information related to the received measurement packet sent from the reception measurement control part 210, and returns the response packet RMP to the packet transmission node 1 via the packet transmission part 21. Here, the response packet RMP may be configured to include a measurement packet count value included in the received measurement packet MP in order to identifying the measurement packet MP to which the response packet responds. In this way, the packet transmission node 1 can efficiently identify the measurement packet MP corresponding to the received response packet RMP.

The measurement data notification part 240 transmits quality data, such as the number of lost packets and a loss rate of packets, accumulated in the loss history part 260, to a predetermined destination via the packet processing part 29 according to an instruction from the reception measurement control part 210. For example, the packet reception node 1 or an additional network management system may be configured to inquire the number of lost packets and a loss rate of packets from the packet reception node 2 by using a node management protocol, such as TELNET, SSH, SNMP, SSH, NETCONF, and FTP, so that the packet reception node 2 transmits in return the quality data such as the number of lost packets, the loss rate of packets, and the time of measurement.

The reception measurement data storage part 250 is an area including reception counters A, B, transmission counters C, D, and measurement packet counters E, F, and the details thereof will be described later with reference to FIG. 12.

The loss history part 260 is an area for accumulatively storing packet transmission quality data, such as the number of lost packets, and a loss rate of packets, in time series, and the details thereof will be described later with reference to FIG. 13.

FIG. 6 illustrates a configuration example in which a packet transmission measurement apparatus 100 is included in a packet transmission node 1 and a packet reception measurement apparatus 200 is included in a packet reception node 2. However, the packet transmission measurement apparatus 100 may be configured to be connected to the packet transmission node 1 via a communication link, and the packet transmission measurement apparatus 200 may be configured to be connected to the packet reception node 2 via a communication link.

In the configuration example in FIG. 6, the counting of the numbers of transmitted/received user packets is usually started or ended as soon as possible when a measurement packet is transmitted or received. However, a time period common to both the packet reception node 2 and the packet transmission node 1 may be set, and the counting may be started after the common time period has elapsed.

Figure 7:
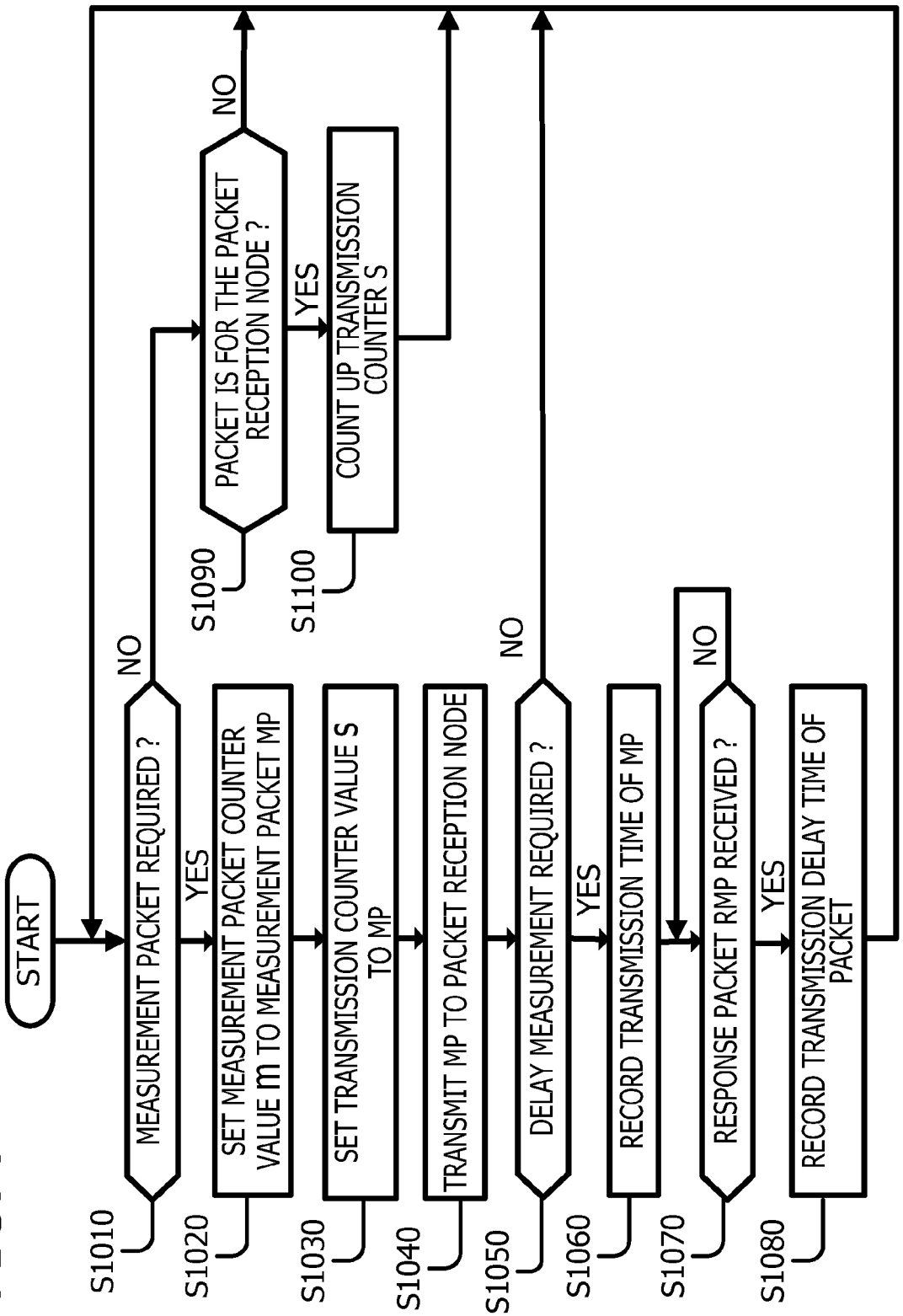
FIG. 7 is a diagram illustrating an example of an operation flow of a packet transmission measurement apparatus, according to an embodiment.

FIG. 7 is a diagram illustrating an example of an operation flow of a packet transmission measurement apparatus, according to an embodiment, in which a main operation flow of the packet transmission measurement apparatus 100 of FIG. 6 is depicted.

Here, the packet transmission part 10 is configured to queue predetermined information to be notified to the packet transmission measurement apparatus 100 every time the packet transmission part 10 transmits a user packet, so that the predetermined information is not lost even if some processing delay occurs in the packet transmission measurement apparatus 100.

In step S1010, it is determined whether or not the creation condition of measurement packet is satisfied, that is, whether or not a measurement packet is required. The process proceeds to the next step S1020 when the measurement packet is required (YES), and moves to step S1090 when the measurement packet is not required (NO). The creation condition of measurement packet may be, for example, that no notification about user packet transmission has been received from the packet transmission part 10 for a certain time period, that a predetermined time period has elapsed, that a state in which the workload of the packet transmission node 1 is low is detected, or that an request for starting the measurement has been received from another node such as a network management system.

In step S1020, the measurement packet counter M in the transmission measurement data storage part 150 is counted up (+1), and the resultant value m is stored in the measurement packet MP.

In step S1030, a transmission counter value (s) is read out from the transmission counter S stored in the transmission measurement data storage part 150 in association with each packet type, and the value (s) read out is stored in the measurement packet MP.

In step S1040, the measurement packet MP including the transmission counter value "s" for each packet type and the measurement packet counter value "m" is transmitted to a predetermined packet reception node 2.

In step S1050, it is determined whether the packet transmission delay is to be measured or not on the basis of the measurement condition information stored in the transmission measurement data storage part 150. The process proceeds to the next step S1060 when the delay measurement is required (YES). The process returns to step S1010 when the delay measurement is not required (NO).

In step S1060, the transmission time of the measurement packet MP is recorded in the transmission measurement data storage part 150.

In step S1070, the packet transmission measurement apparatus 100 waits for the reception of a response packet RMP from the packet reception node 2 in response to the measurement packet MP transmitted in the above step S1040. The process proceeds to the next step S1080 when the response packet RMP is received (YES).

In step S1080, the reception time of the response packet RMP is recorded in the transmission measurement data storage part 150, and the difference between the reception time of the response packet RMP and the transmission time of the corresponding measurement packet MP is calculated as a packet transmission delay time. The calculated packet transmission delay time is stored in the transmission measurement data storage part 150.

At this time, when it is required to accumulate the packet transmission delay time as history information, the information of the measurement packet transmission time, the response packet reception time, and the packet transmission delay time, which are stored in the transmission measurement data storage part 150, are copied to the packet history part 160 and accumulatively recorded therein in time series. Thereafter, the process returns to step S1010, so as to continue the next transmission measurement processing.

In step S1090, it is determined whether or not the user packet is destined for the packet reception node 2. The process proceeds to the next step S1100 when the user packet is destined for the packet reception node 2 (YES). The process returns to step S1010 so as to continue the measurement processing when the user packet is not destined for the packet reception node 2 (NO).

In step S1100, the transmission counter S in the measurement counter part 150 is counted up (+1), and the process returns to step S1010 so as to continue the measurement processing. At this time, when the transmission counter S is provided for each packet type, the transmission counter corresponding to the type of the user packet is counted up.

FIG. 8 is a diagram illustrating an example of an operation flow of a packet reception measurement apparatus, according to an embodiment, depicting a main operation flow of the packet reception measurement apparatus 200 of FIG. 6. Here, every time the packet reception part 10 receives a user packet, the packet reception part 10 sends predetermined information regarding the user packet to the packet reception measurement apparatus 200 by queuing method.

In step S2010, it is determined whether the received packet is a measurement packet MP or not on the basis of the predetermined information sent from the packet reception part 20. The process proceeds to the next step S2020 when the received packet is a measurement packet MP (YES). The process moves to step S2070 when the received packet is not a measurement packet MP (NO).

In step S2020, it is determined whether or not the measurement of a packet transmission delay time is required, on the basis of the measurement condition information stored in the reception measurement data storage part 250. The process proceeds to the next step S2030 when the measurement of a packet transmission delay time is required (YES). The process moves to step S2040 when the measurement of a packet transmission delay time is not required (NO).

In step S2030, the response packet RMP is transmitted to the packet transmission node 1 which is the transmission source of the measurement packet MP. Here, the response packet RMP can be configured to include a measurement packet count value included in the received measurement packet MP in order to identify the measurement packet MP corresponding to the response packet RMP. When the measurement packet count value is included in the response packet RMP, the packet transmission node 1 can efficiently identify the measurement packet MP corresponding to the received response packet RMP.

In step S2040, transmission counters C, D, measurement packet counters E, F included in the reception measurement data storage part 250 are updated. Specifically, the value of the last transmission counter C is copied into the previous transmission counter D, and the transmission counter value included in the received measurement packet MP is set to the last transmission counter C. Here, when the above transmission counter is provided for each packet type of user packet, the above update processing is performed on the transmission counters for each packet type.

The value of the last measurement packet counter E is copied into the previous measurement packet counter F, and the measurement packet counter value included in the received measurement packet MP is set to the last measurement packet counter E.

In step S2050, on the basis of values read out from the reception counters A, B, the transmission counters C, D, and the measurement packet counters E, F included in the reception measurement data storage part 250, the number of lost packets between the time point of receiving the previous measurement packet MP and the time point of receiving the last measurement packet MP, is calculated. Furthermore, the loss rate of packets is calculated from the number of lost packets. The number of lost packets and the loss rate of packets are stored in the measurement data storage part 250. The calculation of the number of lost packets and the loss rate of packets can be performed by using the method described with reference to FIG. 3.

In step S2060, the previous reception counter B included in the reception measurement data storage part 250 is updated. Specifically, the value of the last reception counter A is copied into the previous reception counter B. Thereafter, the process returns to step S2010, so as to continue the reception measurement processing.

In step S2070, it is determined whether or not the packet received from the packet reception part 20 is the user packet P from the packet transmission node 1. The process proceeds to the next step S2080 when the packet is the user packet P from the packet transmission node 1 (YES). Otherwise (NO), the process returns to step S2010 so as to continue the reception measurement processing.

In step S2080, the last reception counter A for the packet type of the user packet P is counted up (+1), and the process returns to step S2010.

Figure 9:
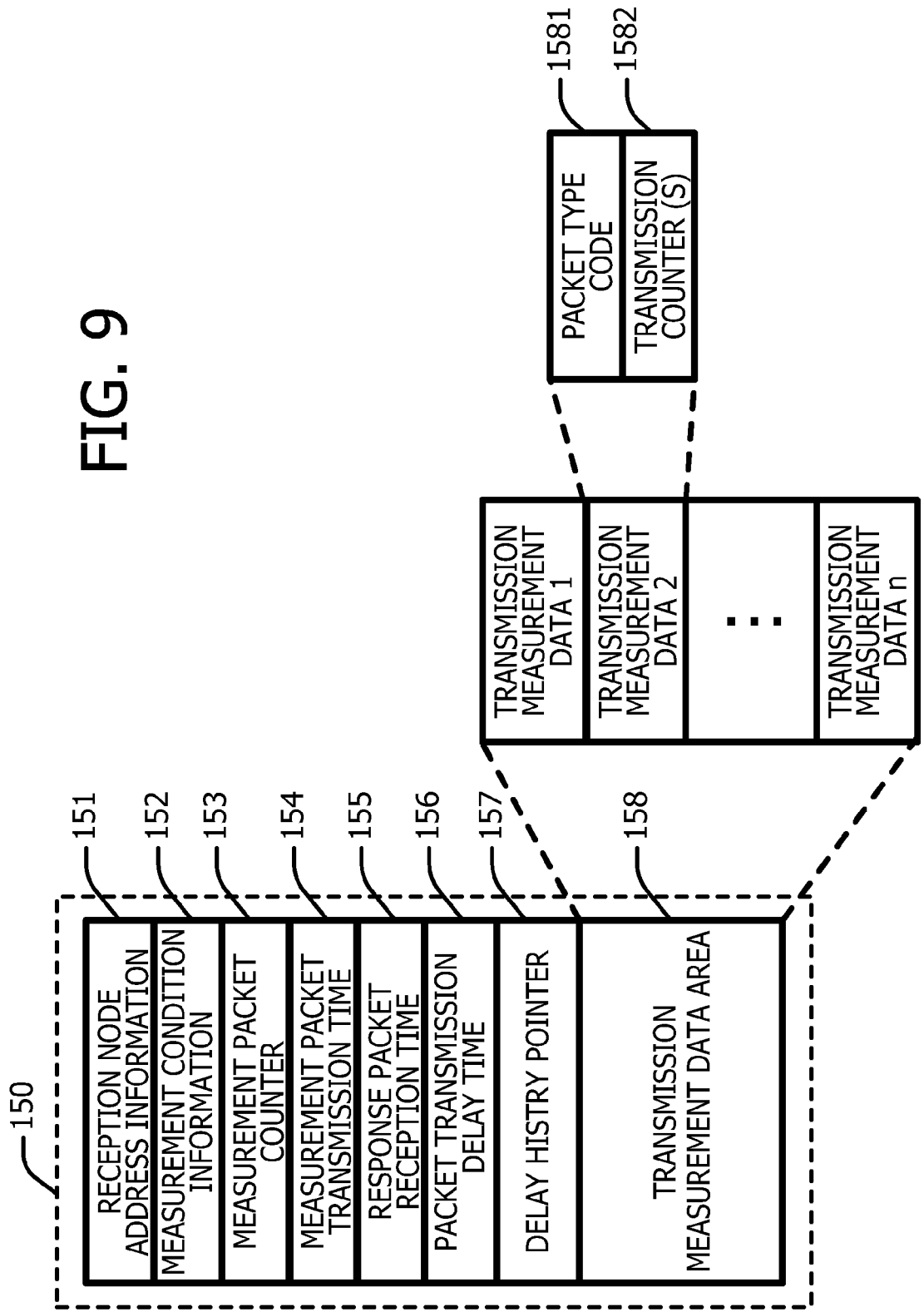
FIG. 9 is a diagram illustrating an example of a configuration of a transmission measurement data storage part, according to an embodiment.

FIG. 9 is a diagram illustrating an example of a configuration of a transmission measurement data storage part, according to an embodiment. A transmission measurement data storage part 150 is provided for each packet reception node which is a measurement point of the packet transmission quality. Therefore, for example, when the packet transmission quality from a single packet transmission node to a plurality of packet reception nodes is measured at the same time, a packet transmission measurement apparatus 100 is provided with a transmission measurement data storage part 150 corresponding to each of the plurality of packet reception nodes.

Address information of the packet reception node which receives the measurement packet and actually measures the packet transmission quality is stored in a packet reception node address information 151. The packet transmission node 1 transmits a measurement packet MP to a packet reception node 2 identified by the packet reception node address information 151, and counts the number of packets transmitted to the packet reception node 2 indicated by the packet reception node address information 151 by using the transmission counter S.

Information indicating the measurement condition of the packet transmission quality regarding the packet reception node identified by the packet reception node address information 151 is set to measurement condition information 152. For example, a measurement packet transmission condition, such as "transmitting the measurement packet at the timing when a user packet has not been transmitted for a predetermined time period" or "transmitting the measurement packet at a predetermined time interval", can be specified. Also, the measurement condition information 152 can be configured to include information for determining whether or not the measurement of a packet transmission delay time is required.

The measurement packet counter M 153 is a counter for storing the number of transmissions of the measurement packet, and counted up (+1) when a measurement packet is transmitted. The counter value which has been counted up is set to the measurement packet MP which is transmitted to the packet reception node 2.

A measurement packet transmission time 154 stores the time information of when the measurement packet was transmitted.

A response packet reception time 155 stores the reception time of the response packet returned from the packet reception node 2 which received the measurement packet MP.

A packet transmission delay time 156 stores, as a packet transmission delay time, the difference between the value of the response packet reception time 155 and the value of the measurement packet transmission time 154, in other words, a response time that is a elapsed time from the time point when the measurement packet is transmitted, to the time point when the response packet responding to the measurement packet is received.

A delay history pointer 157 stores information identifying the position in the packet history part 160, which is described later with reference to FIG. 10. When the packet history information is not accumulated, for example, "0" is set to the delay history pointer 157.

A transmission measurement data area 158 is an area for storing a transmission counter S 1582 which stores the number of transmissions of a user packet, along with the corresponding packet type code 1581. That is, the transmission measurement data area 158 includes, for example as depicted in FIG. 9, a pair of a packet type code 1581 and a transmission counter S 1582, for each of packet types where the number of the packet types is "n".

The packet type code 1581 specifies the type of user packet to be measured, and, for example, a type code which can identify UDP packet and TCP packet can be set to the packet type code 1581. For example, in the case of TCP/IP, an application type indicated by the field of the port number written in the packet header, a packet priority, a control flag, and a value written in the payload which is used by the application, can be used as a packet type code.

As for the packet type code 1581, it is necessary to provide a storage area corresponding to the same packet type code, for both the transmission measurement data storage part 150 in the packet transmission node 1 and the reception measurement data storage part 250 in the packet reception node 2, and the provided storage area needs to be set in advance. Regarding this setting processing, for example, the storage area can be set in advance by using a known operation management protocol such as TELNET, SSH, SNMP, NETCONF, and FTP.

The transmission counter S 1582 is a counter for counting the number of transmissions of a packet having the type code specified by the packet type code 1581, and is counted up (+1) every time the packet specified by the packet type code 1581 is transmitted to the packet reception node 2.

Figure 10:
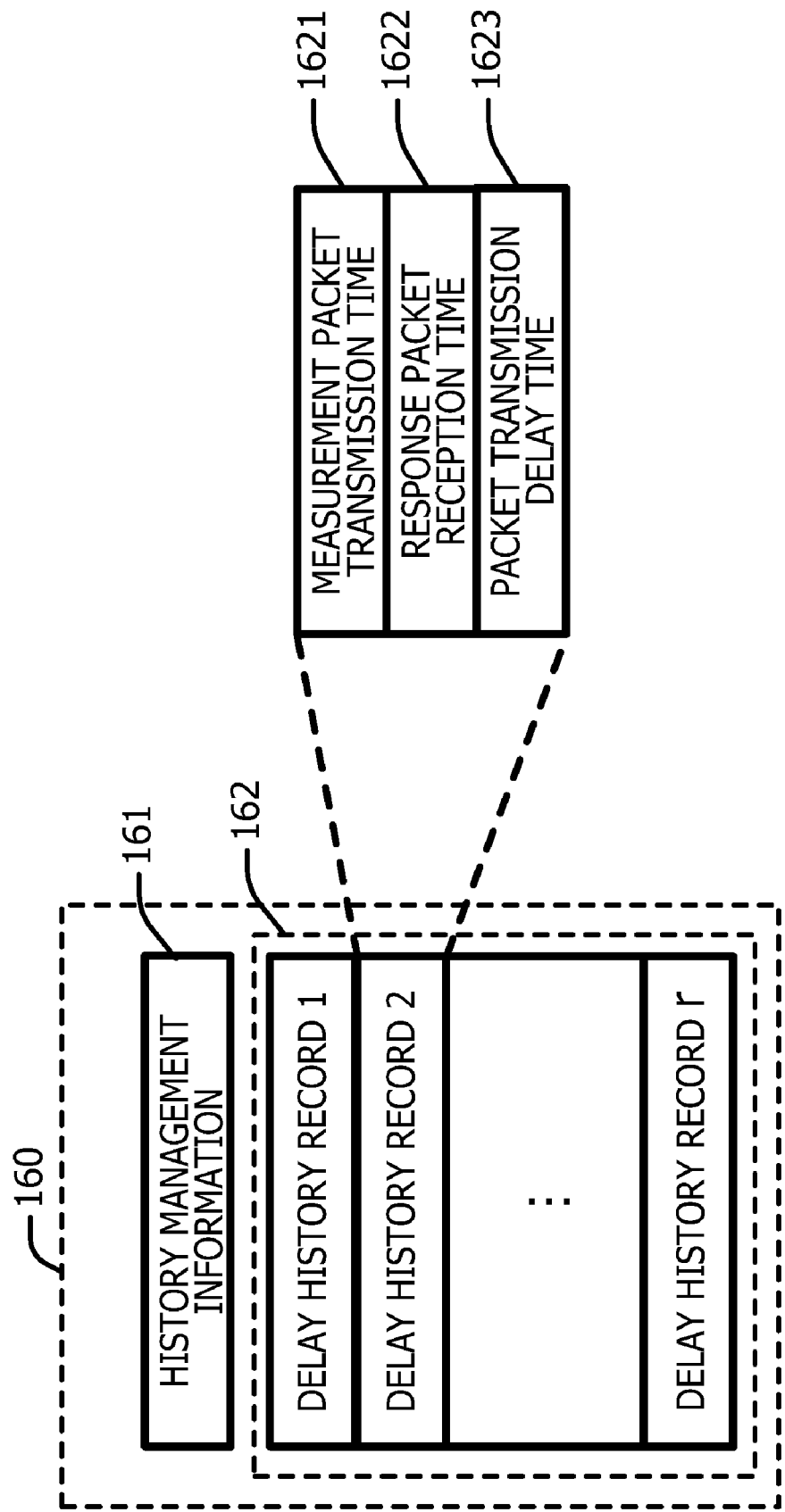
FIG. 10 is a diagram illustrating an example of a configuration of a packet history part, according to an embodiment.

FIG. 10 is a diagram illustrating an example of a configuration of a packet history part, according to an embodiment.

The packet history part 160 includes history management information 161 and a delay history record storage part 162.

The history management information 161 is information for managing the accumulation of delay history records included in the delay history record storage part 162. For example, the history management information 161 can be configured to include the maximum number of records which can be stored in the delay history record storage part 162, and the pointer information of the record recorded lastly.

The delay history record storage part 162 is an area for storing one or more delay history records, and each delay history record includes a measurement packet transmission time 1621, a response packet reception time 1622, and a packet transmission delay time 1623.

By using the packet history part 160, the response time of the response packet RMP from the packet reception node 2 corresponding to the measurement packet can be accumulated as a packet transmission delay time in time series, and for example, the accumulated packet transmission delay time can be transmitted in accordance with a request from a network management system.

Figure 11:
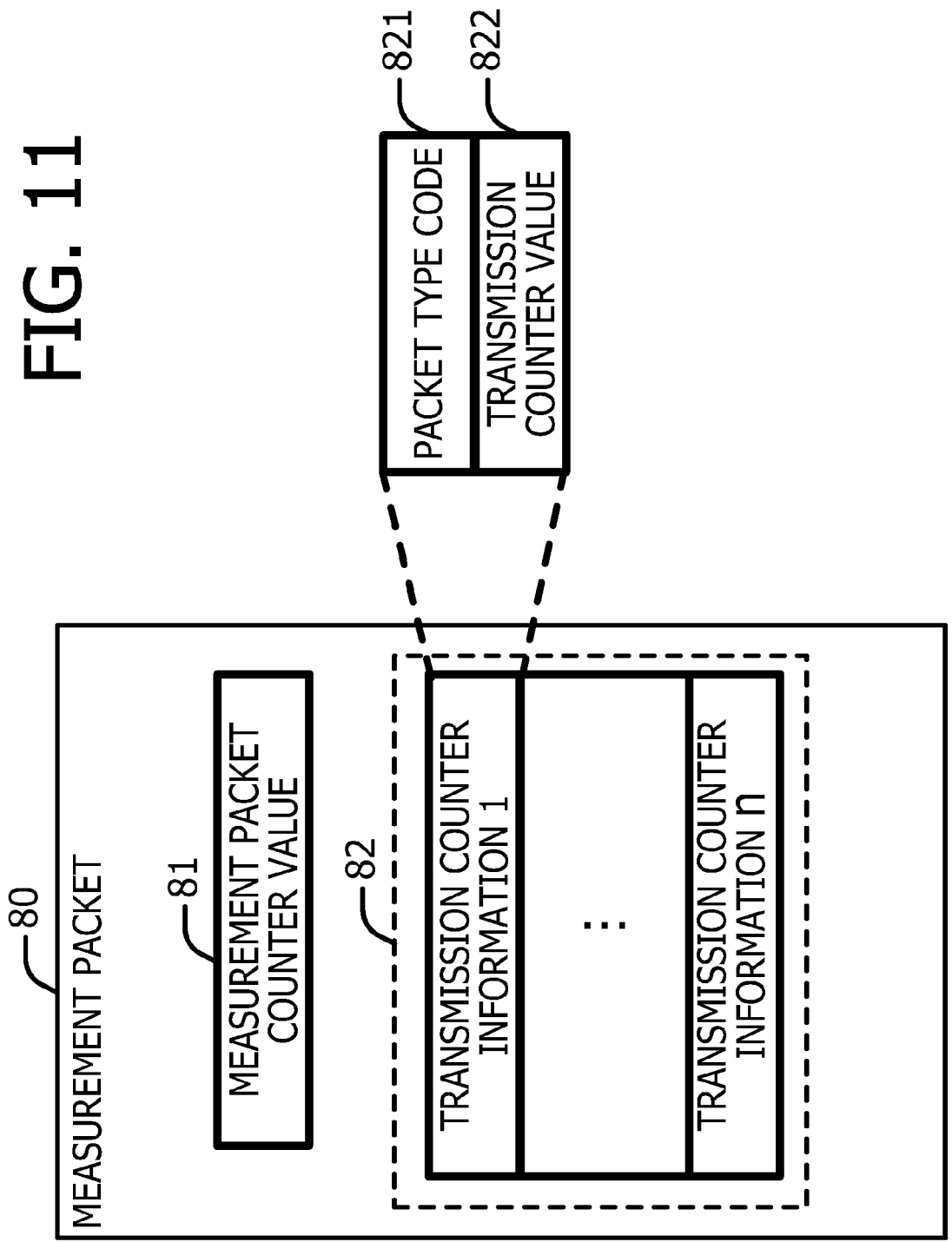
FIG. 11 is a diagram illustrating an example of a configuration of a measurement packet, according to an embodiment.

FIG. 11 is a diagram illustrating an example of a configuration of a measurement packet, according to an embodiment.

A measurement packet MP 80 includes a measurement packet counter value 81 and transmission counter information 82.

When transmitting the measurement packet 80, the value of the measurement packet counter M included in the packet transmission node 1 is counted up first, and the counted-up value is set to the measurement packet counter value 81 in the measurement packet 80 which is to be transmitted.

The transmission counter information 82 includes n pieces of transmission counter information 1 to n, each corresponding to a different packet type, and each of the n pieces of transmission counter information includes a packet type code 821 and a transmission counter value 822. The value of the transmission counter S for each packet type, held by the packet transmission node 1 when the measurement packet is transmitted, is set to the transmission counter value 822 corresponding to the each packet type.

Figure 12:
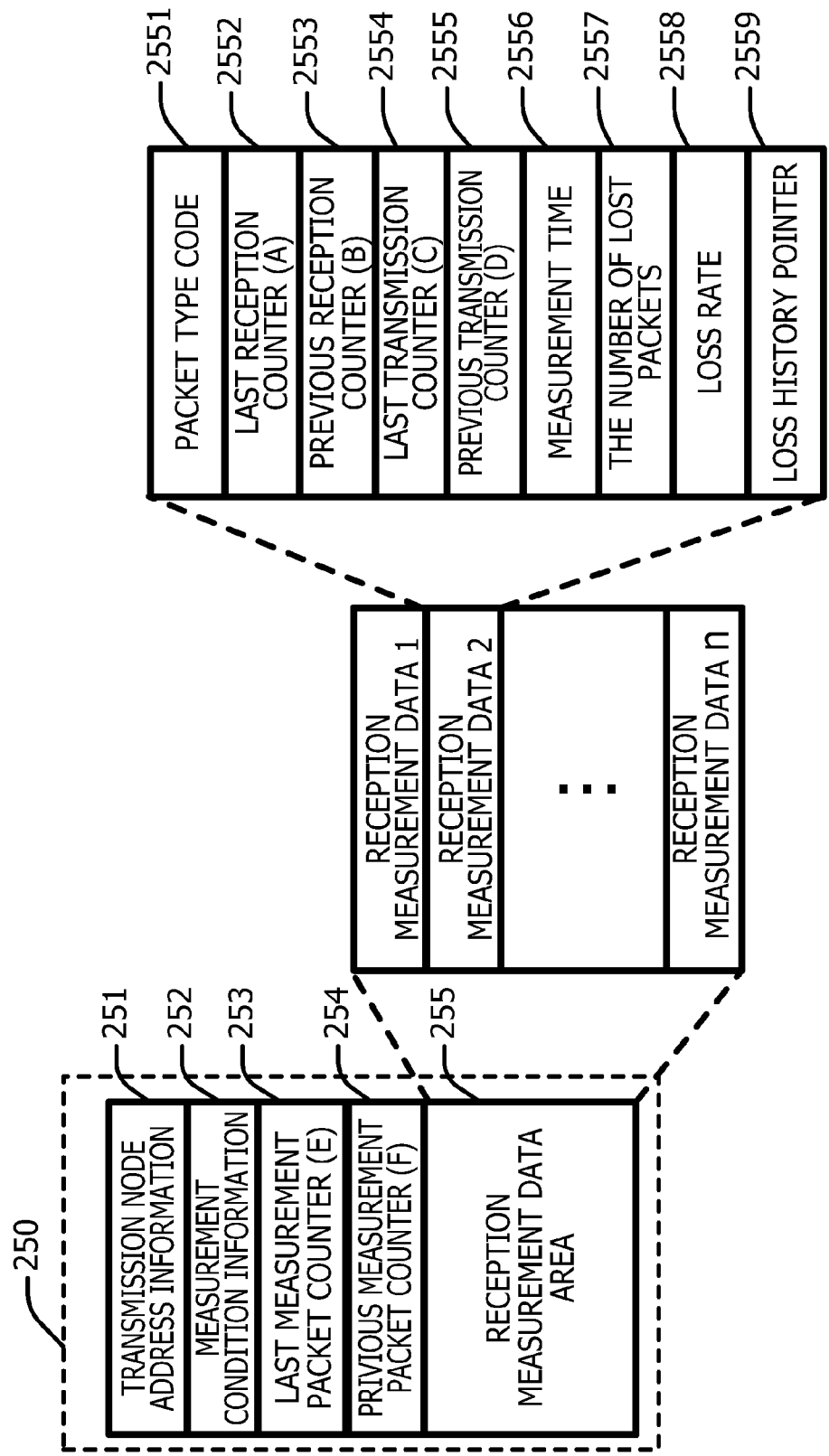
FIG. 12 is a diagram illustrating an example of a configuration of a reception measurement data storage part, according to an embodiment.

FIG. 12 is a diagram illustrating an example of a configuration of a reception measurement data storage part, according to an embodiment.

A packet reception measurement apparatus 200 is provided with a reception measurement data storage part 250 for each packet transmission node which is a transmission source of the measurement packet. Therefore, for example, when the packet transmission qualities from a plurality of packet transmission nodes are measured at the same time in a single packet reception node, a plurality of reception measurement data storage parts 250 depicted in FIG. 12 are provided for the single packet reception node, wherein each of the plurality of reception measurement data storage parts 250 corresponds to each of the plurality of packet transmission nodes.

Address information of a packet transmission node 1 which transmits a measurement packet is stored in packet transmission node address information 251.

Information indicating the measurement condition of the packet transmission quality between the packet reception node and the packet transmission node indicated by the packet transmission node address information 251 is set to measurement condition information 252. For example, a measurement packet transmission condition, such as "transmitting the measurement packet at the timing when a user packet has not been transmitted for a predetermined time period" or "transmitting the measurement packet at a predetermined time interval", can be specified by the measurement condition information 252. Also, information indicating whether the packet transmission delay time should be measured or not can be set to measurement condition information 252.

The last measurement packet counter E 253 is a counter for storing the number of receptions of a measurement packet MP. When the measurement packet MP is received, the value of the last measurement packet counter E 253 is copied into the previous measurement packet counter F 254, and thereafter, and the measurement packet counter value included in the received measurement packet MP is set to the last measurement packet counter E 253.

The previous measurement packet counter F 254 is a counter for storing the previous value of the number of receptions of a measurement packet MP, which is equal to the value of the last measurement packet counter E at the time point when the previous measurement packet MP is received. When the measurement packet MP is received, the value of the last measurement packet counter E 253 which has not yet been counted up, is copied into the previous measurement packet counter F 254.

The reception measurement data area 255 is an area for storing reception measurement data for each packet type code.

Each reception measurement data includes, for example, a packet type code 2551, a last reception counter A 2552, a previous reception counter B 2553, a last transmission counter C 2554, a previous transmission counter D 2555, a measurement time 2556, the number of lost packets 2557, a loss rate 2558, and a loss history pointer 2559.

The packet type code 2551 specifies the type of a packet to be measured, and it is the same as that depicted in FIG. 9. Therefore, the detailed description thereof is omitted here.

The last reception counter A 2552 is a counter for counting the number of receptions of a user packet.

The previous reception counter B 2553 is a counter for storing the number of receptions of a user packet at the time point when the previous measurement packet is received. The value of the last reception counter A 2552 is copied into the previous reception counter B 2553 after the measurement packet MP is received and the packet transmission quality data (the number of lost packets, the loss rate, and the like) is calculated.

The last transmission counter C 2554 is a counter for storing the transmission counter value included in the measurement packet MP received last.

The previous transmission counter D 2555 is a counter for storing the transmission counter value included in the measurement packet MP received just before the measurement packet MP received last. When the measurement packet MP is received, the value of the last transmission counter C 2554 is copied into the previous transmission counter D 2555.

The measurement time 2556 stores the time when the packet transmission quality data, such as the number of lost packets and the loss rate of packets, is calculated on the basis of the values of the above counters A, B, C, D, E, and F.

The number of lost packets 2557 is calculated on the basis of the values of the above counters A, B, C, D, E, F, and indicates the number of packets which are lost during a time period from the previous reception time of the measurement packet MP to the last reception time of the measurement packet MP. There are two cases for calculating the number of lost packets. In the first case, the number of lost user packets P is calculated, and in the second case, the number of lost packets including the lost user packets P and lost measurement packets MP is calculated.

The loss rate 2558 is a packet loss occurrence rate, which is obtained by dividing the number of packets, which were lost during a time period from the previous reception time of the measurement packet MP to the last reception time of the measurement packet MP, by the number of all the packets which were transmitted in the same time period.

The loss history pointer 2559 holds pointer information for pointing the arrangement position of the loss history part 260 which is an area for accumulating the number of lost packets and the loss rate of packets in the order of measurement times. For example, when a value other than "0" is set to the loss history pointer 2559, information including the measurement time 2556, the number of lost packets 2557, and the loss rate 2558, is accumulatively recorded in the loss history part 260 as described later. In the case, when a value "0" is set to the loss history pointer 2559, nothing may be accumulatively recorded in the loss history part 260.

Figure 13:
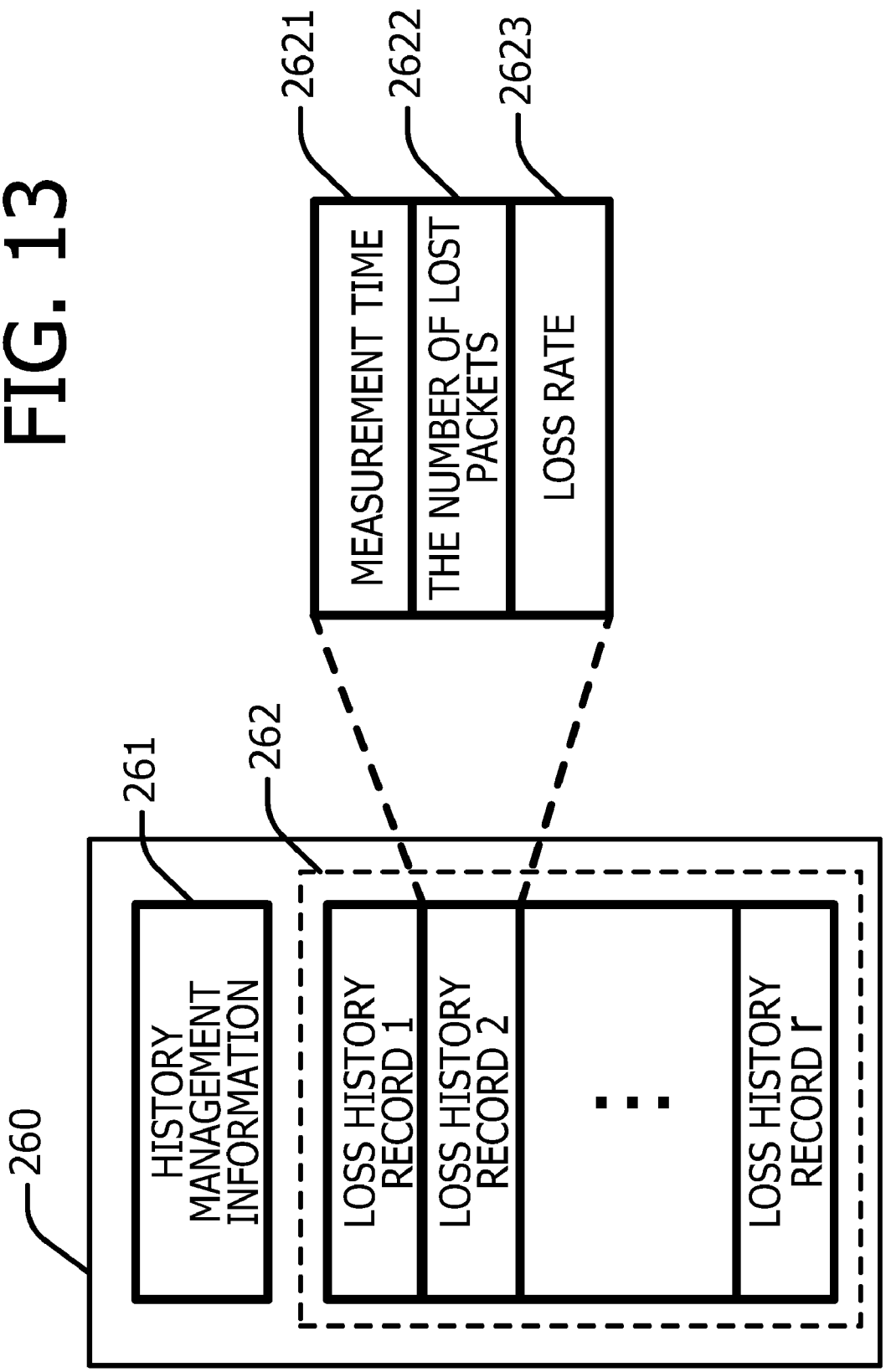
FIG. 13 is a diagram illustrating a configuration of a loss history part, according to an embodiment.

FIG. 13 is a diagram illustrating a configuration of a loss history part, according to an embodiment.

A loss history part 260 can be configured to include history management information 261 and a loss history record storage part 262.

The history management information 261 is information for managing the accumulation of loss history records in the loss history record storage part 262. For example, the history management information 261 can include the maximum number of records which can be stored in the loss history record storage part 262, pointer information of the record that has been recorded last, and the like.

The loss history record storage part 262 is an area in which the loss history records are accumulatively stored in time series, and each loss history record includes a measurement time 2621, the number of lost packets 2622, and a loss rate 2623.

By using the loss history part 260, the number of lost packets and the loss rate of packets, calculated by the packet reception node which receives the measurement packet, can be accumulated in time series. For example, the packet transmission quality information such as the number of lost packets and the loss rate of packets, which have been accumulated, can be transmitted in accordance with a request from a network management system.

Figure 14:
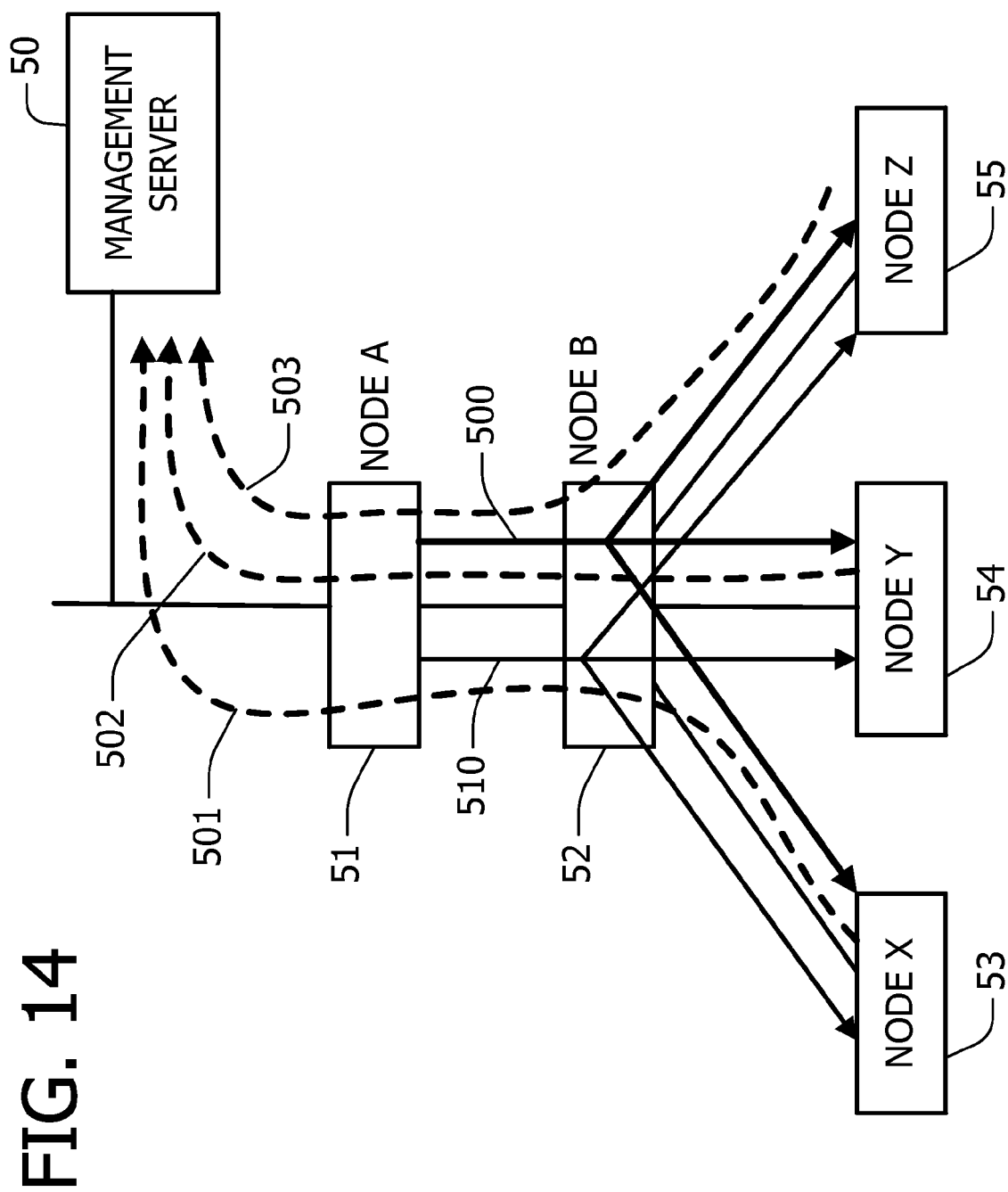
FIG. 14 is a diagram illustrating an example of a network configuration in which multicast transmission of a packet is performed, according to an embodiment.

FIG. 14 is a diagram illustrating an example of a network configuration in which multicast transmission of a packet is performed, according to an embodiment.

In FIG. 14, user packets are multicast from the node 51 operating as the packet transmission node A to the node 53 (node X), the node 54 (node Y), and the node 55 (node Z) which operate as the packet reception nodes, via the node 52 (node B).

In a multicast communication, although the number of user packets 510 transmitted from the node A to the node B is one, the user packet is copied in the node B for each of the destination nodes X, Y, Z, and transmitted to each of the destination nodes.

The measurement packet MP 500 for measuring the packet transmission quality is also transmitted to the nodes X, Y, Z by the multicast communication in the same way. Thereafter, the measured quality data 501, 502, 503 are transmitted respectively from the destination nodes X, Y, Z to the management server 50.

In order to determine whether the user packet P transmitted by the multicast communication is correctly received by the nodes X, Y, Z, the packet transmission node A counts the number of packets transmitted by the multicast communication whose quality is to be measured, by using the transmission counter S, and multicasts a measurement packet MP including the value of the transmission counter S included in the packet transmission node A, to nodes X, Y, Z. It is possible to use unicast, broadcast, or multicast as means to transmit the measurement packet MP. However, when multicast communication or broadcast communication is used, the measurement packet MP arrives at each of the nodes X, Y, Z almost at the same time even if only one measurement packet MP is transmitted from the packet transmission node A. Therefore, to measure the quality of communication in which packets arrive at multiple points almost at the same time, such as multicast communication, multicast and broadcast are more suitable than unicast.

Next, in each of the nodes X, Y, Z, the number of receptions of user packets P in the multicast communication is counted in the reception counter, and when the measurement packet MP is received, the difference between the measurement packet counter value included in the measurement packet MP and the reception counter value is calculated, so that the number of the lost packets is obtained, and then the loss rate is calculated.

The counter value counted in each reception node may be transmitted to a packet transmission node A or a management server 50 which operates and manages the network. When there is a management server 50, the packet transmission node A transmits the transmission counter value and the measurement packet counter value included in the measurement packet to the management server 50 at the same time.

In the management server 50, the communication quality between the packet transmission node A and the packet reception nodes X, Y, Z is calculated from the counter values transmitted from the packet reception nodes X, Y, Z. For example, when one of multicast packets to the packet reception node Y is lost, the packet count from the packet reception node Y is two. However, the number of packets transmitted by the packet transmission node A is three. Therefore it is known that one packet is lost. Or, the packet reception node Y may simply transmit the fact that the packet loss count is one, to the management server 50.

When there are many nodes to be measured, measurement results from many nodes may concentrate in the server and increase the workload of the server, so that the measurement may be affected.

Therefore, when the nodes which receive the measurement packet MP can be specified in advance, it is possible to set beforehand a reporting time at which the node transmits the result, and/or a reporting time period from when the measurement result is obtained to when the measurement result is transmitted, for each node, in order that many measurement results are not intensively transmitted in a certain time period. The setting of the reporting time and/or the reporting time period to the node can be performed by using the management packet and/or an existing operation management protocol.

Figure 15:
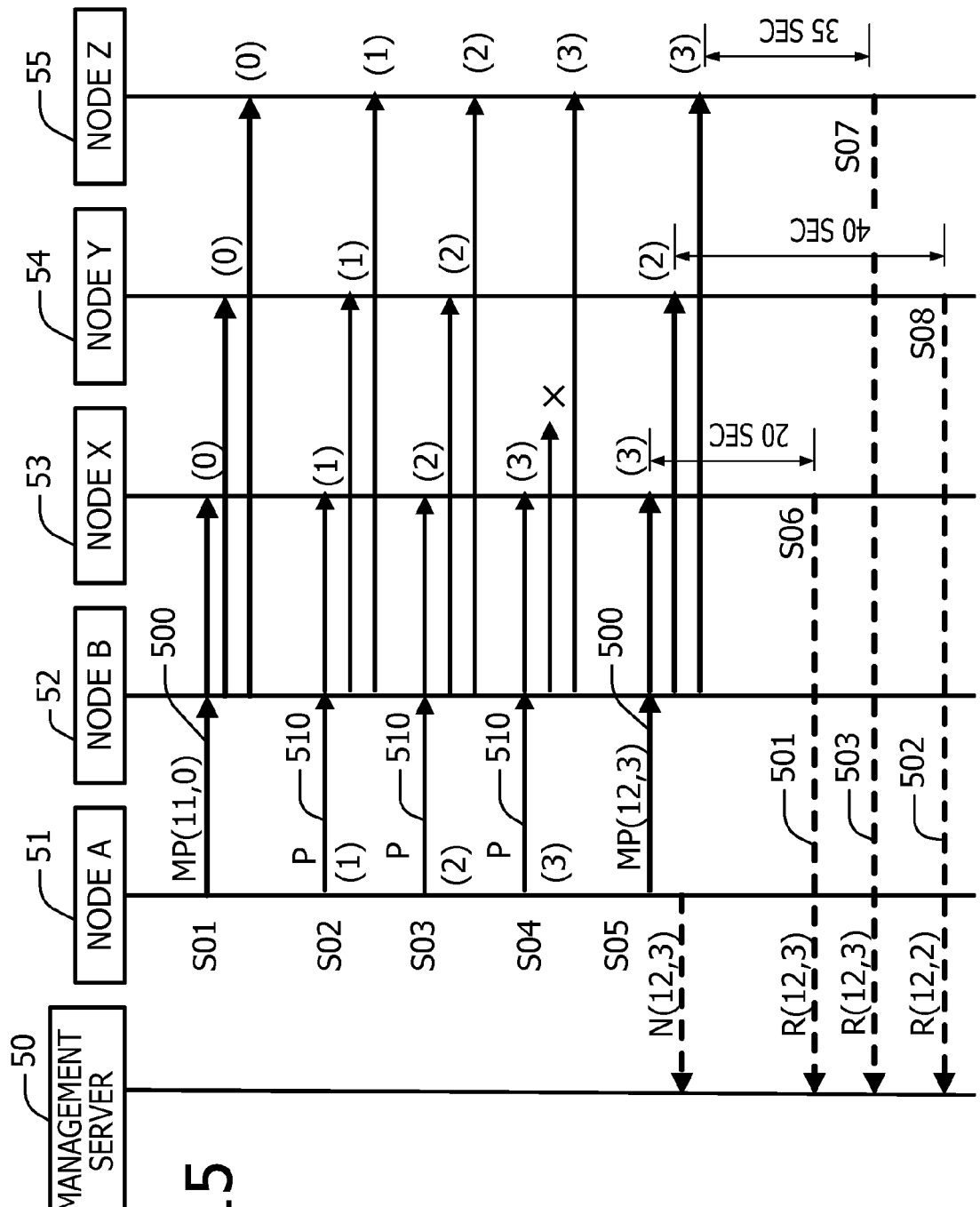
FIG. 15 is a diagram illustrating an example of a sequence of a transmission quality measurement in the case of multicasting a packet, according to an embodiment.

FIG. 15 is a diagram illustrating an example of a sequence of a transmission quality measurement in the case of multicasting a packet, according to an embodiment, indicating a packet transmission sequence modeled on the network configuration example depicted in FIG. 14.

In step S01, the measurement packet MP (11, 0) 500 is multicast from the node A to the nodes X, Y, Z via the node B. At this time, the value of the measurement packet counter M is "11", and the value of the transmission counter S is the initial value "0".

In step S02, a user packet P 510 is multicast from the node A to the nodes X, Y, Z via the node B. At this time, the value of the transmission counter S is "1".

In step S03, a user packet P 510 is multicast from the node A to the nodes X, Y, Z via the node B. At this time, the value of the transmission counter S is "2".

In step S04, a user packet P 510 is multicast from the node A to the nodes X, Y, Z via the node B. However, the packet transmitted to the node Y is lost for some reason. At this time, the value of the transmission counter S is "3".

In step S05, the measurement packet MP (12, 3) 500 is multicast from the node A to the nodes X, Y, Z via the node B. At this time, the value of the measurement packet counter M is "12", and the value of the transmission counter S is "3". At this time, the measurement packet counter value "12" and the transmission counter value "3" included in the measurement packet MP (12, 3) 500 are transmitted from the node A to the management server 50 (denoted as N (12, 3) in FIG. 15), so that the management server 50 can use the values when analyzing the measurement data later.

In step S06, when receiving the measurement packet MP (12, 3) transmitted in the above step S05, the node X calculates the quality data (the number of lost packets, the loss rate, and the like), and, for example after 20 seconds, transmits the calculation result R (12, 3) 501 to the management server 50. Here, the measurement packet counter value "12" and the reception counter value "3" are included in R (12, 3), so that the values can be used in the measurement data analysis processing in the management server 50. The same process is performed in the steps S07 and S08 below.

In step S07, when receiving the measurement packet MP transmitted in the above step S05, the node Z calculates the quality data (the number of lost packets, the loss rate, and the like), and, for example after 35 seconds, transmits the calculation result R(12, 3) 503 to the management server 50.

In step S08, when receiving the measurement packet MP transmitted in the above step S05, the node Y calculates the quality data (the number of lost packets, the loss rate of packets, and the like), and, for example after 40 seconds, transmits the calculation result (R(12, 2) 502 to the management server 50.

When the nodes which receive the measurement packet MP cannot be specified, for example, when the measurement packet is transmitted by using multicast or broadcast as described in the above steps S06 to S08, setting information may be included in the measurement packet so that each node transmits the measurement result at stochastically random time intervals, or the setting information may be set in each node by using an operation management protocol. In this way, the case in which many measurement results are intensively transmitted in a certain time period can be avoided. For example, the setting information can be configured to include a description or setting such as "transmitting after elapse of random time so that an average transmission interval becomes 30 seconds".

In FIG. 15, the sequence of transmitting the measurement result of each node X, Y, Z corresponding to the first measurement packet is omitted.

When a setting that one out of every ten nodes transmits the measurement result in 30 minutes is desired to be set, the measurement packet MP including information of a probability of 10% and a time interval of 30 seconds, should be created and transmitted, or these values should be set in each packet reception node.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A method for measuring packet transmission quality in a communication network including a packet transmission node and a packet reception node, comprising:
    providing the packet transmission node with a transmission counter and a measurement packet counter, the transmission counter counting the number of packets transmitted from the packet transmission node to the packet reception node, the measurement packet counter counting the number of measurement packets transmitted from the packet transmission node to the packet reception mode so as to measure transmission quality of packets transmitted from the packet transmission node to the packet reception node;
    providing the packet reception node with a reception counter counting the number of packets received from the packet transmission node;
    transmitting, by the packet transmission node, to the packet reception node a measurement packet including a transmission counter read out from the transmission counter and a measurement packet counter value read out from the measurement packet counter; and
    calculating, by the packet reception node, the number of lost packets or a loss rate of packets on the basis of the transmission counter value obtained from the received measurement packets, the measurement packet counter value obtained from the received measurement packets, and a reception counter value read out from the reception counter.

2. The method of claim 1, further comprising:
    providing the packet reception node with a pair of measurement packet counters, a pair of transmission counters, and a pair of reception counters, the pair of measurement packet counters storing measurement packet counter values included in measurement packets received previously and lastly, respectively, the pair of transmission counters storing transmission counter values included in measurement packets received previously and lastly, respectively, the pair of reception counters storing respective reception counter values counted previously and lastly, respectively, wherein
    the packet reception node calculates the number of lost packets or a loss rate of packets during a time period from the previous reception time of a measurement packet to the last reception time of a measurement packet, on the basis of values read out from the pair of measurement packet counters, the pair of transmission counters, and the pair of reception counters.

3. The method of claim 2, further comprising:
    providing the packet transmission node with a transmission counter for each of packet types; and
    providing the packet reception node with a pair of reception counters and a pair of transmission counters, for each of the packet types, wherein
    the packet reception node calculates, for each of the packet types, the number of lost packets or a loss rate of packets during a time period from the previous reception time of a measurement packet to the last reception time of a measurement packet, on the basis of values read out from the pair of measurement packet counters, the pair of transmission counters provided for the each of the one or more packet, and the pair of reception counters provided for the each of the one or more packet.

4. The method of claim 1, further comprising:
monitoring, by the packet transmission node, a traffic volume of packets transmitted from the packet transmission node, wherein
the packet transmission node transmits a measurement packet when it is determined that an effect on a traffic of packets transmitted from the transmission node is small.

5. The method of claim 4, further comprising:
monitoring, by the packet transmission node, a non-communication time period during which a packet is not transmitted from the packet transmission node, wherein
the packet transmission node transmits a measurement packet when the non-communication time period exceeds a predetermined time period.

6. The method of claim 1, further comprising:
transmitting, by the packet reception node, a response packet to the packet transmission node upon receiving a measurement packet from the packet transmission node; and
calculating, by the packet transmission node, as a transmission delay time, a time period from the transmitting time of the measurement packet to the receiving time of the response packet.

7. The method of claim 6, further comprising:
accumulating, by the packet transmission node, the transmission delay time as time-series data.

8. The method of claim 1, further comprising:
multicasting, by the packet transmission node, a packet to a plurality of packet reception nodes;
multicasting, by the packet transmission node, a measurement packet to the plurality of reception nodes; and
transmitting, by each of the plurality of packet reception nodes, the calculated number of lost packets or the calculated loss rate of packets to a management server for managing the communication network, at a predetermined time.

9. A packet transmission measurement apparatus for measuring packet transmission quality in a communication network including a packet transmission node and a packet reception node, comprising:
a transmission counter for counting the number of packets transmitted from the packet transmission node to the packet reception node;
a measurement packet creation part for creating a measurement packet that is used for measuring transmission quality of packets transmitted from the packet transmission node to the packet reception node; and
a measurement packet counter for counting the number of measurement packets transmitted from the packet transmission node to the packet reception node, wherein
the measurement packet creation part transmits, to the packet reception node, a measurement packet that includes a transmission counter value read out from the transmission counter and a measurement packet counter value read out from the measurement packet counter.

10. The packet transmission measurement apparatus of claim 9, further comprising:
a transmission measurement control part for monitoring a traffic volume of packets transmitted from the packet transmission node, wherein
the measurement packet creation part transmits a measurement packet when it is determined that an effect on a traffic of packets transmitted from the transmission node is small.

11. The packet transmission measurement apparatus of claim 10, wherein
the transmission measurement control part monitors a non-communication time period during which a packet is not transmitted from the packet transmission node, wherein
the measurement packet creation part transmits a measurement packet when the non-communication time period exceeds a predetermined time period.

12. The packet transmission measurement apparatus of claim 9, further comprising:
a response packet processing part for calculating, as a transmission delay time, a time period from the transmitting time of a measurement packet to the receiving time of a response packet transmitted from the packet reception node in response to the measurement packet transmitted from the packet transmission node;
a packet history part for accumulating the calculated transmission delay time as time-series data; and
a measurement data notification part for transmitting the accumulated transmission delay time upon receiving a request from a node other than the packet transmission node.

13. A packet reception measurement apparatus for measuring packet transmission quality in a communication network including a packet transmission node and a packet reception node, comprising:
a reception counter for counting the number of packets received from the packet transmission node by the packet reception node;
a measurement packet counter for storing a measurement packet counter value indicating the number of measurement packets received from the packet transmission node by the packet reception node;
a transmission counter for storing a transmission counter value indicating the number of packets transmitted from the packet transmission node to the packet reception node; and
a loss calculation part for calculating the number of lost packets or a loss rate of packets on the basis of the values read out from the transmission counter, the measurement packet counter, and the reception counter, wherein
the transmission counter value and the measurement packet counter value are obtained from a measurement packet transmitted from the packet transmission node to the packet reception node.

14. The packet reception measurement apparatus of claim 13, further comprising:
a pair of measurement packet counters for storing measurement packet counter values included in measurement packets received previously and lastly, respectively;
a pair of transmission counters for storing transmission counter values included in measurement packets received previously and lastly, respectively; and
a pair of reception counters for storing the number of packets received from the packet transmission node at the previous reception time of a measurement packet and at the last reception time of a measurement packet, respectively, wherein
the loss calculation part calculates the number of lost packets or a loss rate of packets during a time period from the previous reception time of a measurement packet to the last reception time of a measurement packet, on the basis of values obtained from the pair of measurement packet counters, the pair of transmission counters, and the pair of reception counters.

15. The packet reception measurement apparatus of claim 13, wherein
  a transmission counter and a reception counter are provided for each of packet types,
  and the loss calculation part calculates the number of lost packets or a loss rate of packets for the each of packet types.

16. The packet reception measurement apparatus of claim 13, further comprising:
  a response processing part for transmitting a response packet to the packet transmission node upon receiving a measurement packet transmitted from the packet transmission node.

17. The packet reception measurement apparatus of claim 13, further comprising:
  a loss history part for accumulating, as time-series data, the number of lost packets or the loss rate of packets calculated by the loss calculation part; and
  a measurement data notification part for notifying the accumulated number of lost packets or the accumulated loss rate of packets in response to an request from a node other than the packet reception node.

* * * * *